(12) United States Patent
Meehan

(10) Patent No.: US 10,147,078 B2
(45) Date of Patent: Dec. 4, 2018

(54) DISTRIBUTED TRANSACTION PROCESSING SYSTEM AND METHODS

(75) Inventor: Rory Meehan, Dublin (IE)

(73) Assignee: Planet Payment Solutions Limited, Dublin (IE)

( * ) Notice: Subject to any disclaimer, the term of this patent is extended or adjusted under 35 U.S.C. 154(b) by 86 days.

(21) Appl. No.: 14/126,284

(22) PCT Filed: Jun. 21, 2012

(86) PCT No.: PCT/EP2012/061955
§ 371 (c)(1),
(2), (4) Date: Jan. 30, 2014

(87) PCT Pub. No.: WO2012/175606
PCT Pub. Date: Dec. 27, 2012

(65) Prior Publication Data
US 2014/0143078 A1    May 22, 2014

(30) Foreign Application Priority Data
Jun. 24, 2011 (EP) .................................. 11171370

(51) Int. Cl.
*G06Q 20/20* (2012.01)
*G06Q 20/32* (2012.01)

(52) U.S. Cl.
CPC ......... *G06Q 20/202* (2013.01); *G06Q 20/204* (2013.01); *G06Q 20/3229* (2013.01); *G06Q 20/3278* (2013.01)

(58) Field of Classification Search
None
See application file for complete search history.

(56) References Cited

U.S. PATENT DOCUMENTS

| 8,600,881 B2 * | 12/2013 | Nguyen ................. G06Q 20/20 235/1 R |
| 2004/0098350 A1 * | 5/2004 | Labrou .................. G06Q 20/02 705/64 |
| 2007/0022058 A1 * | 1/2007 | Labrou .................. G06Q 20/32 705/67 |
| 2009/0281904 A1 | 11/2009 | Pharris |
| 2010/0211506 A1 | 8/2010 | Chang et al. |
| 2011/0131104 A1 | 6/2011 | Rose et al. |

(Continued)

*Primary Examiner* — Paul Danneman
(74) *Attorney, Agent, or Firm* — Abelman Frayne & Schwab

(57) ABSTRACT

A method and a system for processing a transaction in a distributed electronic payment system are disclosed. The system comprises at least one point of sale terminal and at least one customer mobile terminal, each being respectively configured to communicate with at least one host terminal over a network. A machine-readable unique identifier of the at least one point of sale terminal is read by the at least one customer mobile terminal. At each of the at least one point of sale terminal and the at least one customer mobile terminal, a respective transaction request message is encoded and communicated to the at least one host terminal, which includes the unique identifier. At the least one host terminal, the respective transaction request messages are matched with the unique identifier and a payment request message is encoded and communicated to the at least one customer mobile terminal.

14 Claims, 14 Drawing Sheets

(56) References Cited

U.S. PATENT DOCUMENTS

2012/0062363 A1\* 3/2012 St George ............ G07G 1/0018
340/5.64
2012/0226565 A1\* 9/2012 Drozd .................... G06Q 20/20
705/16
2012/0290421 A1\* 11/2012 Qawami ................ G06Q 20/20
705/21

\* cited by examiner

DISTRIBUTED TRANSACTION PROCESSING SYSTEM AND METHODS

FIELD OF THE INVENTION

The present invention relates to electronic transaction processing systems at point of sales. More particularly, the present invention relates to distributed electronic transaction processing systems having network-connected point of sales and mobile customer terminals.

BACKGROUND TO THE INVENTION

Many distributed electronic transaction processing systems are known, the most ubiquitous being that in which point of sale terminals are configured as card payment terminals for use with individual payment cards, which have financial account and/or cardholder data encoded thereon, in a magnetic strip and/or an embedded EEPROM or 'chip'. During a transaction, a card payment terminal typically reads the encoded data from the card memory means and connects to a plurality of remote terminals over a network, for purposes of card authentication, checking funds availability, personal identification number verification, transaction authorising and processing, all being implemented as local and/or remote data communication messages.

Millions of such electronic transactions are processed across the world on a daily basis, in ever greater numbers, and the data processing and networking infrastructure required to support them represents a significant cost, spread across the card schemes which administer payment card data and transaction settling systems, the financial organisations which administer the payment card systems and transaction authorising systems, and the retailers and service providers themselves. Further cost considerations arise from the constant requirement to improve system and card data security, and the need to manage growing systemic complexity inherent to the global scale of card payment systems.

In this context, technological updates demanded by users for increasing their control over, and the convenience of conducting, electronic transactions, are increasingly fraught by scaling considerations. Recently, there has been a drive to enable the interoperability of personal communication devices, such as mobile telephone handsets, with electronic card payment systems.

Recent systems developed for this purpose typically interface a customer's mobile terminal with a proximate point of sale terminal, by means of either reconfiguring the point of sale terminal with an additional, wireless local networking device or apparatus, or simply changing the point of sale terminal altogether for a newer model having such wireless local networking functionality built-in. DE102007005427 discloses such a system, wherein a point of sale terminal (POS) is reconfigured or otherwise interfaced with an RFID device, and wherein each electronic transaction is processed through a combination of local data communications between a customer's mobile communication terminal and the RFID device and remote data communications between the POS and a remote trust centre system.

Such systems have not been widely adopted so far, because all actors in distributed electronic transaction processing systems, i.e. card schemes, financial organisations, retail organisations and now mobile phone handset manufacturers, have failed to agree a common technical approach, resulting in disparate solutions which are either unable to accommodate most mobile phone handsets or which are simply uneconomical: traditionally, rolling out a new payment mechanism involves the take-up of corresponding acceptance hardware that is integrated with the point of sale terminal, which is expensive and requires costly support and maintenance, particularly in its early adoption phase.

As the challenges remain to efficiently, conveniently and cost-effectively connect most types of customer mobile terminals with merchant's point of sale terminals in stores, and to thereafter reliably and securely process electronic transactions between merchants and users of these customer mobile terminals, a new distributed electronic transaction processing system is required, which obviates at least some of the disadvantages associated with the prior art systems.

SUMMARY OF THE INVENTION

According to a first aspect of the present invention, there is a provided a method of processing a transaction in a distributed electronic payment system comprising at least one point of sale terminal and at least one customer mobile terminal, each being respectively configured to communicate with at least one host terminal over a network, the method comprising the steps of associating the at least one point of sale terminal with a machine-readable unique identifier at the least one host terminal, reading the machine-readable unique identifier associated with the at least one point of sale terminal with the at least one customer mobile terminal; at each of the at least one point of sale terminal and the at least one customer mobile terminal, encoding and communicating a respective transaction request message to the at least one host terminal, wherein the encoded transaction request message of the at least one customer mobile terminal includes the unique identifier read; and at the least one host terminal, matching the respective transaction request messages with the unique identifier and encoding and communicating a payment request message to the at least one customer mobile terminal.

In an embodiment of the present invention, an inexpensive machine-readable terminal identifier is affixed to any existing point of sale terminal, and existing customer mobile terminals and point of sale terminals are configured with respective, unobtrusive sets of data processing instructions which repurpose their hardware features, pursuant to which users of suitably configured customer mobile terminals can actively control the electronic transaction process at the point of sale, without requiring the addition of new point of sale data processing hardware or the replacement of terminals.

The transaction request sent to the at least one customer mobile terminal includes, in its simplest embodiment, a request for payment with an amount. However, further embodiments contemplate the inclusion of store-specific and/or location data, for instance store name, address and optionally corporate trade mark or logo; payable amount in store currency; items concerned by the transaction and still more information pertaining to facilitate the mobile terminal user's decision to accept or reject the transaction request.

In a particularly useful embodiment, the data included in the transaction request sent to the at least one customer mobile terminal contains all the data present on a conventional point of sale receipt, whereby the transaction request effectively embodies an electronic receipt permitting a fully-paperless transaction, which is environmentally convenient and saves further transaction time. This embodiment also usefully allows the mobile terminal user to receive and review a transaction receipt before authorizing a payment.

In an embodiment of the present invention, the method preferably comprises the further step of inputting a personal identification number at the at least one customer mobile terminal, in response to the transaction request message. Users of customer mobile terminals thus remain at liberty to cancel the electronic transaction prior to inputting the PIN and, advantageously and securely, input the PIN on their personal customer mobile terminal rather than on a third party's terminal.

In a variant of this embodiment, the method preferably comprises the further steps of encoding and communicating the personal identification number to at the at least one host terminal. The at least one host terminal may then process the electronic transaction with known back-end electronic transaction processing systems to which it is also connected, for instance card payment remote hosts.

In an embodiment of the present invention, the method preferably comprises the further step of communicating a message indicative of transaction completion to the at least one point of sale terminal with the at least one host terminal. The merchant user of the at least one point of sale terminal is thus informed that a payment operation has been completed, and that the customer user of the customer mobile terminal now has ownership of the goods sold.

In an embodiment of the present invention, the method preferably comprises the further step of communicating a message indicative of transaction completion to the at least one customer mobile terminal with the at least one host terminal. The customer user of the customer mobile terminal is thus informed that he or she now has ownership of the goods sold.

In an embodiment of the present invention, the method preferably comprises the further step of storing image data representative of the user of the at least one customer mobile terminal at the at least one host terminal. Operators of the at least one host terminal thus benefit from a form of positive identification of each user of a customer mobile terminal configured for use with the host terminal. This method may advantageously comprise the further step of including the image data representative of the user in the message indicative of transaction completion sent to the at least one point of sale terminal. The merchant user of the at least one point of sale terminal thus also benefits from a positive identification of the user of the customer mobile terminal substantially at the time of transaction, for mitigating the fraudulent use of misappropriated customer mobile terminals.

The machine-readable terminal identifier is preferably a near field communication (NFC) tag selected from the group comprising an optical machine-readable tag such as a one-dimensional barcode or a two-dimensional barcode, a radio-frequency identifier (RFID) tag and a wireless network terminal identifier.

According to another aspect of the present invention, there is a provided a distributed electronic transaction system comprising a plurality of terminals connected to a network, the said terminals including at least one host terminal, at least one point of sale terminal configured with a machine-readable unique identifier, and at least one customer mobile terminal having means to read the machine-readable unique identifier. Each of the at least one point of sale terminal and at least one customer mobile terminal comprises means for encoding a transaction request message including the unique identifier, and means for communicating encoded transaction request messages to the at least one host terminal over the network. The at least one host terminal comprises means for associating the at least one point of sale terminal with the machine-readable unique identifier; means for matching transaction request messages, means for encoding a payment request message, and means for communicating the encoded payment request message to the at least one customer mobile terminal over the network.

In an embodiment of the present invention, the identifier is preferably a near field communication (NFC) tag.

In a preferred embodiment of the system, the tag is a one-dimensional barcode or a two-dimensional barcode, and the means to read the identifier comprises optical capturing means. Alternatively, the tag may be a radio-frequency identifier (RFID) tag, and the means to read the identifier comprises radio-frequency receiving means. Alternatively still, the tag may be a wireless network terminal identifier, for instance a Bluetooth or WLAN ('Wi-Fi') terminal name, and the means to read the identifier comprises wireless local networking means.

At its simplest, the tag is a label with a pre-printed, machine-readable pictogram encoding a numerical or alpha-numerical expression, which usefully implements proximity electronic payment at point of sales equipped with legacy electronic transaction processing hardware, without the need for any local hardware or software specifically bridging the tag with that legacy hardware and, accordingly, with no additional power requirement. Rather, the customer terminal and the at least one remote host bear the corresponding data processing overhead.

The legacy electronic transaction processing hardware requires a minimal set of instructions for implementing additional communications with the at least one host terminal, wherein such communications use known formats and protocols and, at the time of processing an electronic transaction according to the invention, effectively replace equivalent communications with conventional remote hosts for purposes of card transaction authorising, acquiring and the like. Accordingly, in addition to the above benefits, the tag further implements proximity electronic payment without increasing the bandwidth requirements of the legacy electronic transaction processing hardware.

In an embodiment of the present invention, the means for encoding a transaction request message including the unique identifier preferably comprises a terminal central processing unit configured by a set of data processing instructions.

In an embodiment of the present invention, the means for matching transaction request messages and the means for encoding a payment request message preferably comprises a host terminal central processing unit configured by a set of data processing instructions.

In an embodiment of the present invention, the host terminal encoding means is preferably further adapted to encode a transaction completion message.

In an embodiment of the present invention, the at least one host terminal preferably further comprises means for storing image data representative of the user of the at least one customer mobile terminal.

In an embodiment of the present invention, the host terminal encoding means is preferably further adapted to include image data representative of the user in the message indicative of transaction completion.

According to a further aspect of the present invention, there is provided a method of configuring a point of sale terminal for use with the system described above, comprising the steps of affixing the machine-readable unique identifier to the point of sale terminal; requesting and obtaining a set of data processing instructions from the at least one host terminal over the network; and communicating at least one parameter representative of the point of sale terminal to the at least one host terminal.

In an embodiment of the present invention, the method preferably comprises the further step of affixing the near field communication (NFC) tag preferably comprises the further step of securing the identifier on a surface of the point of sale terminal, which is visible to the user of the customer mobile terminal in use. Alternatively, the step of affixing the machine-readable unique identifier may be replaced by a step of embossing the machine-readable unique identifier on a surface of the point of sale terminal.

In an embodiment of the present invention, the method preferably comprises the further step of periodically requesting and obtaining an updated set of data processing instructions from the at least one host terminal over the network. For instance, the update may advantageously reduce the memory requirements for the set of data processing instructions, or the number of data processing cycles required to perform the transaction method, thereby allowing the point of sale terminal to process more transactions per time period.

According to yet another aspect of the present invention, there is provided a method of configuring a customer mobile terminal for use with the system described above, comprising the steps of requesting and obtaining a set of data processing instructions from the at least one host terminal over the network; and communicating at least one parameter representative of the user of the customer mobile terminal to the at least one host terminal.

In an embodiment of the present invention, a network location of the at least one host terminal is preferably encoded in the machine-readable identifier, such that the step of requesting the set of data processing instructions may comprise the further step of reading the machine-readable identifier. Customers may thus configure their personal customer mobile terminal at the point of sale, in a simple and substantially automatic manner, if they have not previously had an occasion to do so.

In an embodiment of the present invention, the at least one parameter representative of the user is preferably selected from the group comprising a photograph of the user, a name of the user and residence data of the user.

In an embodiment of the present invention, the method preferably comprises the further step of periodically requesting and obtaining an updated set of data processing instructions from the at least one host terminal over the network. For instance, the update may advantageously reduce the memory requirements for the set of data processing instructions, or reduce the number of data processing cycles required to perform the transaction method, thereby saving battery power of the mobile terminal.

Throughout any of the above embodiments, the at least one point of sale terminal may be embodied by a second customer mobile terminal, thus permitting electronic payments between mobile terminals according to the configuring and operating principles set out and described herein.

Other aspects are set in the claims herein.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The words "comprises/comprising" and the words "having/including" when used herein with reference to the present invention are used to specify the presence of stated features, integers, steps or components but does not preclude the presence or addition of one or more other features, integers, steps, components or groups thereof.

Figure 1:
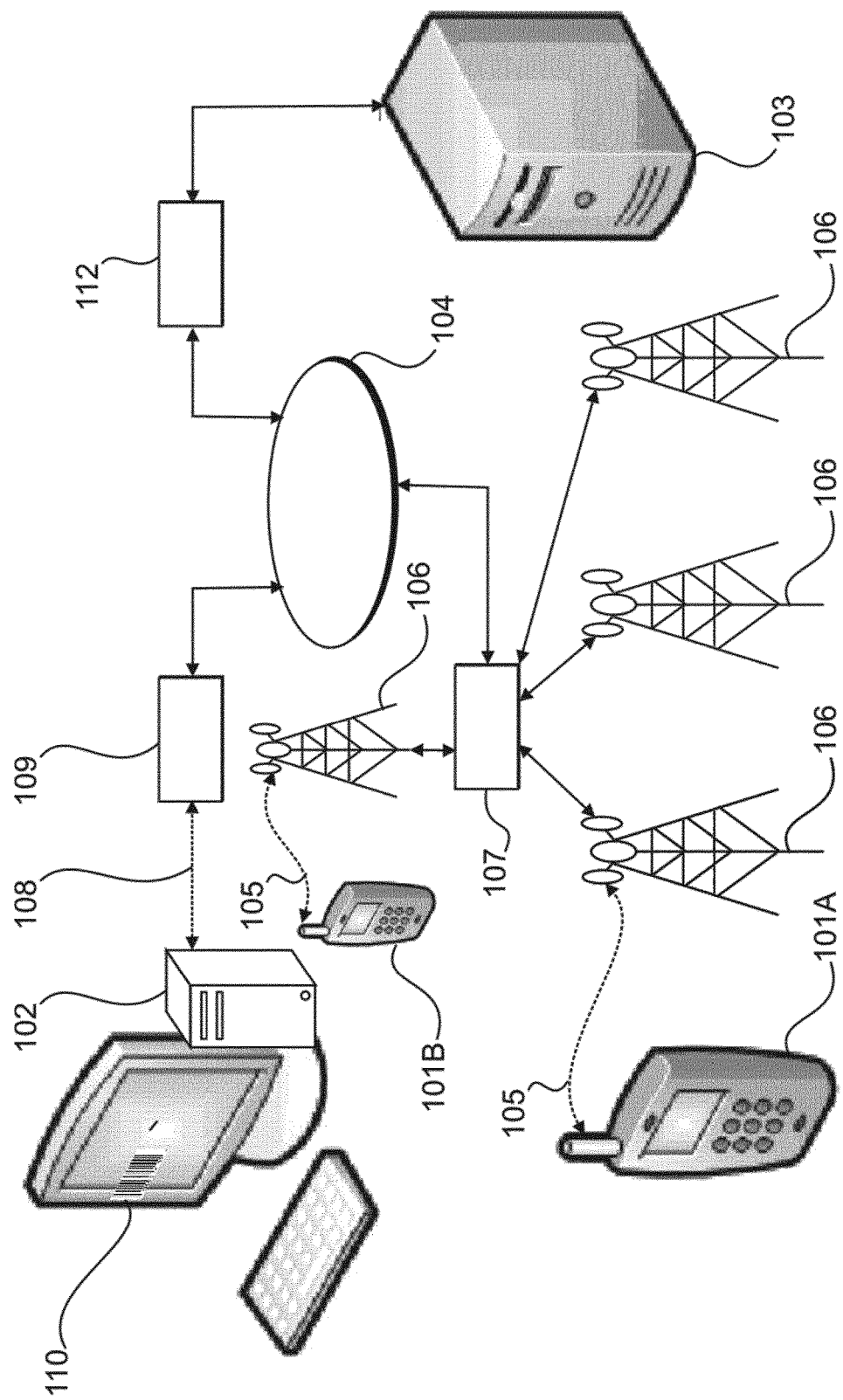
FIG. 1 shows a networked environment in which an embodiment of the invention is implemented, including a plurality of terminals.

FIG. 1 shows a networked environment in which an embodiment of the invention is implemented, including a plurality of terminals. The electronic transaction processing system comprises at least one customer mobile terminal 101A, at least one point of sale terminal 102 and at least one host terminal 103, each terminal being connected to a communication network 104. The merchant using the at least one point of sale terminal 102 may have the use of a merchant mobile terminal 101B.

In the example, the mobile terminals 101A, 101B are a mobile telephone handsets having wireless telecommunication emitting and receiving functionality over a cellular telephone network configured according to the Global System for Mobile Communication ('GSM'), General Packet Radio Service ('GPRS'), International Mobile Telecommunications-2000 (IMT—2000, '3G') network industry standards, and wherein telecommunication is performed as voice, alphanumeric or audio-video data using the Short Message Service ('SMS') protocol, the Wireless Application protocol ('VAP') the Hypertext Transfer Protocol ('HTTP')

or the Secure Hypertext Transfer Protocol ('HTTPS'). The mobile telephone handset 101A, 101B receives or emits voice, text, audio and/or image data encoded as a digital signal over a wireless data transmission 105, wherein the signal is relayed respectively to or from the device by the geographically-closest communication link relay 106 of a plurality thereof. The plurality of communication link relays 106 allows digital signals to be routed between the mobile handset 101A and their destination by means of a remote gateway 107. Gateway 107 is for instance a communication network switch, which couples digital signal traffic between wireless telecommunication networks, such as the network within which wireless data transmissions 107 take place, and the communication network 101A, which is a Wide Area Network ('WAN') 104, an example of which being the Internet. The gateway 107 further provides protocol conversion if required, for instance whether the mobile handset 101A uses the WAP or HTTPS protocol to communicate data.

Alternatively, or in addition, the customer mobile terminal 101A, 101B may have wireless telecommunication emitting and receiving functionality over a wireless local area network ('WLAN') conforming to the 802.11 standard ('Wi-Fi') and wherein telecommunication is likewise performed as voice, alphanumeric or audio-video data using the voice data over IP ('VoIP') protocol, the Hypertext Transfer Protocol ('HTTP') or the Secure Hypertext Transfer Protocol ('HTTPS'), the signal being relayed respectively to or from the customer mobile terminal 101A by a wireless router 109 interfacing the mobile telephone handset 101A, 101B to the WAN communication network 104.

The customer mobile terminal 101A, 101B may for instance be an iPhone™ handset manufactured by the Apple Corporation or a Nexus One™ handset manufactured for Google, Inc. by the HTC Corporation. Generally, the customer mobile terminal 101A, 101B may be any portable computing device having at least means to read a point of sale terminal identifier as will be described hereafter, and networking means apt to establish a bilateral data communication with to the host terminal 104.

In the example, the point of sale terminal 102 is a computing device which emits and receives data encoded as a digital signal over a wireless data transmission 108 conforming to the IEEE 802.11 ('Wi-Fi') standard, wherein the signal is relayed respectively to or from the computing device by the wireless router 109 interfacing the computing device 102 to the WAN communication network 104

The computing device may alternatively emit and receive data encoded as a digital signal over a wired data transmission conforming to the IEEE 802.3 ('Gigabit Ethernet') standard, wherein the signal is relayed respectively to or from the computing device by a wired router interfacing the computing device to the WAN 101A.

The point of sale terminal 102 may for instance be a EFT series terminal manufactured by Ingenico, an Optimum T series terminal manufactured by Hypercom, or an MX 800 series terminal manufactured by VeriFone. Generally, the point of sale terminal 102 may be any computing device having at least networking means apt to establish a bilateral data communication with to the host terminal 104, noting that a built-in capacity to read memory means of payment cards is not material to the present invention.

Figure 2:
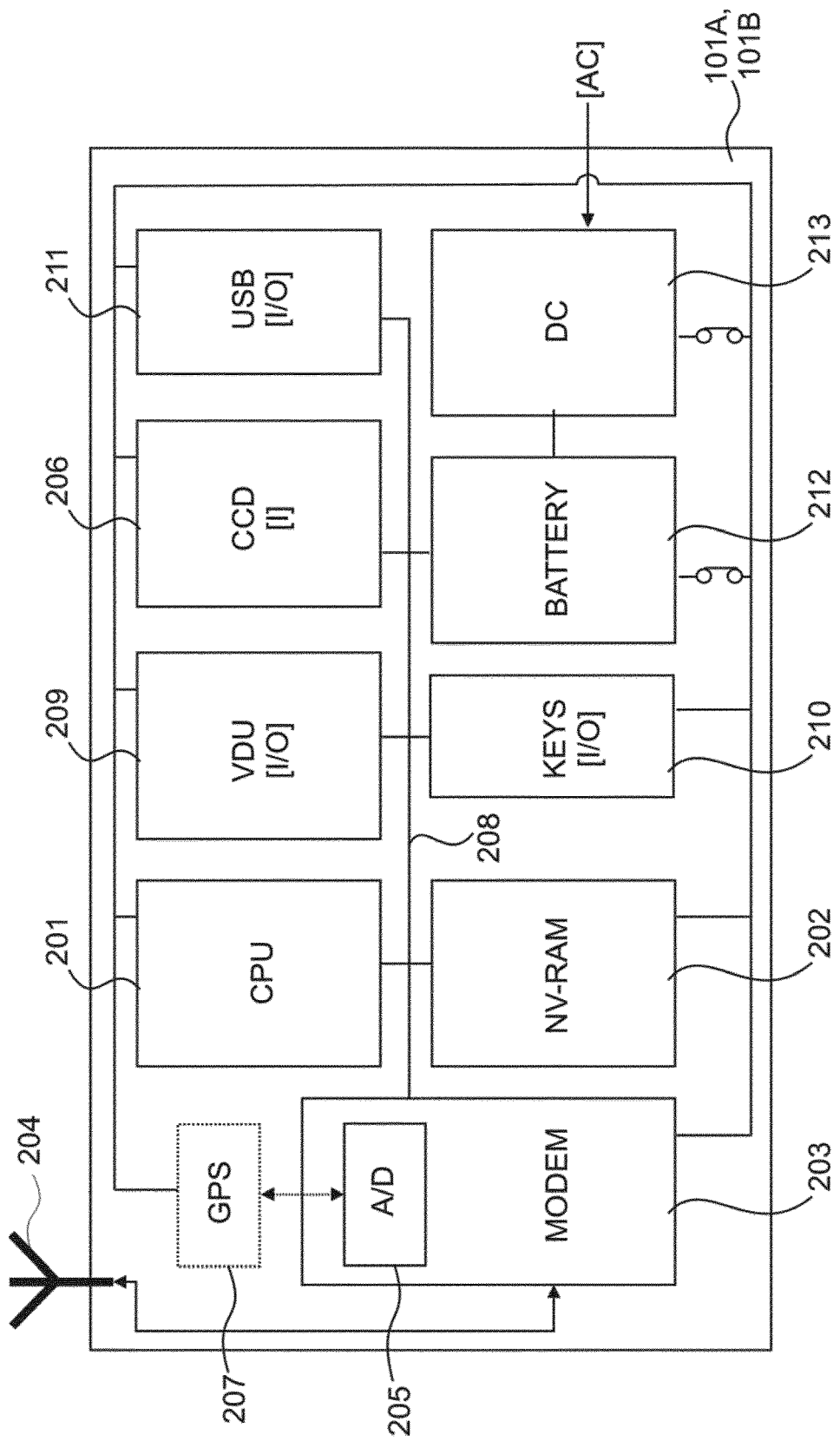
FIG. 2 shows a hardware structure of a customer mobile terminal shown in FIG. 1.

A typical hardware architecture of the mobile communication device 101A, 101B is shown in FIG. 2 in further detail, by way of non-limitative example. The mobile handset 101A, 101B firstly includes a data processing unit 201, for instance a general-purpose microprocessor ('CPU'), acting as the main controller of mobile handset 101A, 101B and which is coupled with memory means 202, comprising non-volatile random-access memory ('NVRAM').

The mobile communication device 101A, 101B further includes a modem 203 to implement the wireless communication functionality, as the modem provides the hardware interface to external communication systems, such as the GSM or GPRS cellular telephone network 106, 107, shown in FIG. 1. An aerial 204 coupled with the modem 203 facilitates the reception of wireless signals from nearby communication link relays 106. The modem 203 includes an analogue-to-digital converter 205 ('ADC') for demodulating wavelength wireless signals received via the antenna 204 into digital data, and reciprocally for outgoing data. The mobile handset 101A, 101B further includes imaging means 206 in the form of an electronic image sensor, for capturing image data which the data processing unit 201 or a dedicated data processing unit processes into digital image data. The mobile handset 101A, 101B may optionally further include self-locating means in the form of a GPS receiver 207, wherein the ADC 205 receives analogue positional and time data from an orbiting satellite (not shown), which the data processing unit 201 or a dedicated data processing unit processes into digital data.

The CPU 201, NVRAM 202, modem 203, digital camera 206 and optional GPS receiver 207 are connected by a data input/output bus 208, over which they communicate and to which further components of the mobile handset 101A, 101B are similarly connected, in order to provide wireless communication functionality and receive user interrupts, inputs and configuration data. Alphanumerical and/or image data processed by CPU 201 is output to a video display unit 209 ('VDU'), from which user interrupts may also be received if it is a touch screen display. Further user interrupts may also be received from a keypad 210 of the handset, or from an external human interface device ('HiD') connected to the handset via a Universal Serial Bus ('USB') interface 211. The USB interface advantageously also allows the CPU 201 to read data from and/or write data to an external storage device. Power is provided to the handset 101A, 101B by an internal module battery 212, which an electrical converter 213 charges from a mains power supply as and when required.

Figure 3:
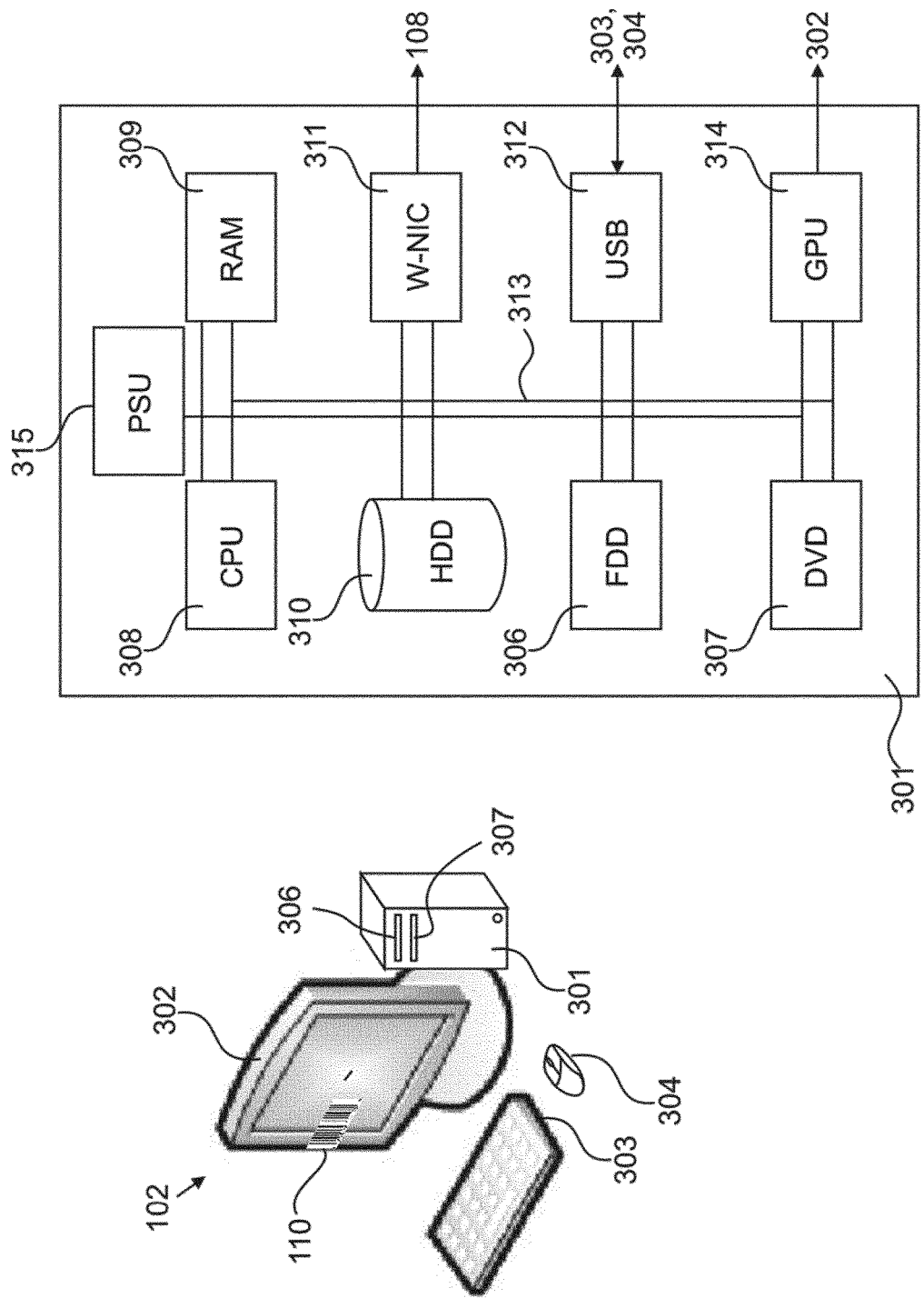
FIG. 3 shows a hardware structure of a point of sale terminal and a host terminal shown in FIG. 1.

A typical hardware architecture of either the point of sale terminal 102 or the host terminal 103 or both is shown in FIG. 3 in further detail, by way of non-limitative example.

The data processing device 102 is a computer configured with a data processing unit 301, data outputting means such as video display unit (VDU) 302, data inputting means such as HiD devices, commonly a keyboard 303 and a pointing device (mouse) 304, as well as the VDU 202 itself if it is a touch screen display, and data inputting/outputting means such as the wireless network connection 108 to the router 109, a magnetic data-carrying medium reader/writer 306 and an optical data-carrying medium reader/writer 307.

Within data processing unit 301, a central processing unit (CPU) 308 provides task co-ordination and data processing functionality. Instructions and data for the CPU 308 are stored in memory means 309 and a hard disk storage unit 310 facilitates non-volatile storage of the instructions and the data. A wireless network interface card (NIC) 311 provides the interface to the network connection 108. A universal serial bus (USB) input/output interface 312 facilitates connection to the keyboard and pointing devices 303, 304.

All of the above devices are connected to a data input/output bus 313, to which the magnetic data-carrying medium reader/writer 306 and optical data-carrying medium reader/writer 307 are also connected. A video adapter 314 receives CPU instructions over the bus 313 for outputting processed data to VDU 302. All the components of data processing unit 301 are powered by a power supply unit 315, which receives electrical power from a local mains power source and transforms same according to component ratings and requirements.

The hardware architecture of the host terminal 103 is substantially similar to that of the point of sale terminal 102 shown in FIG. 3, as skilled persons will readily understand.

With reference to FIGS. 1 to 3, hardware components of the embodiment system described thus far are essentially conventional. The present invention introduces an inexpensive machine-readable terminal identifier 110, which is affixed to the point of sale terminal 102 by its user at the time of registering the point of sale terminal 102 with the system at the host terminal 104, as will be described hereafter. The machine-readable terminal identifier 110 embodies the unique physical identity of the terminal 102 in the system only. For each customer mobile terminal 101A conducting a transaction at that point of sale terminal 102, and for each distinct transaction conducted by a same customer mobile terminal 101A at that point of sale terminal 102, the machine-readable terminal identifier 110 is used as a common linking variable. associated with each unique transaction instance between a customer mobile terminal 101A with the point of sale terminal 102 across the network, without there being any requirement to configure either terminal 101A, 102 with additional acceptance or compliance hardware.

The machine-readable terminal identifier 110 is thus apt to retrofit legacy point of sale terminals 102, possibly even deemed otherwise obsolete, with a proximity or 'Near Field' communication capability, by simply affixing a self-adhesive pre-printed label 401 or 402 to the terminal 102 in its simplest embodiment.

Figure 4:
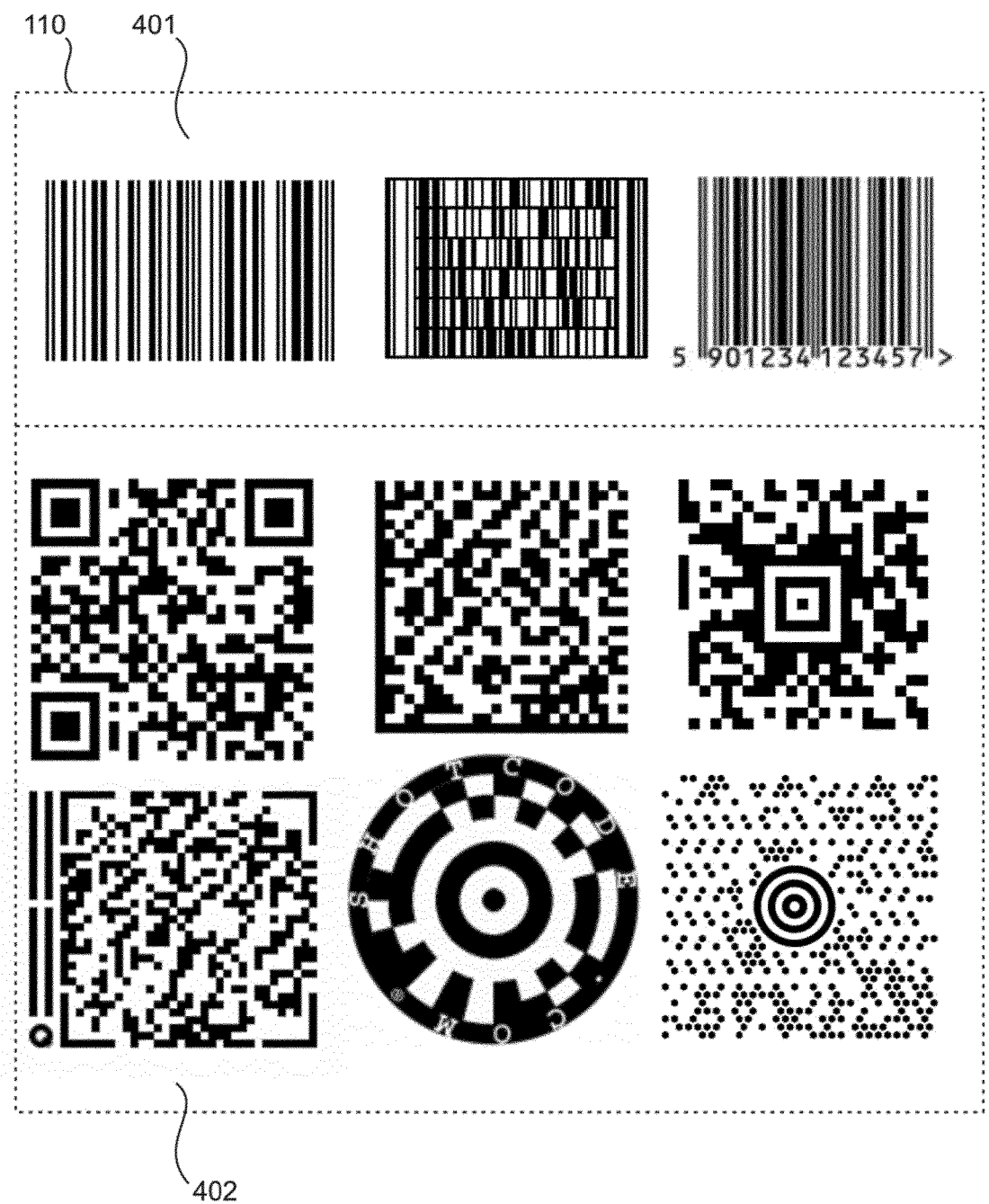
FIG. 4 shows examples of unique machine-readable identifiers that may be affixed to the point of sale terminal of FIG. 3.

Example embodiments of machine-readable terminal identifiers 110 are shown in FIG. 4 as optical machine-readable data constructs, conventionally referred to as barcodes. Machine-readable terminal identifiers 110 suitable for use with the system of the present invention include linear or 'one-dimensional' barcodes 401, which represent data by varying the widths and spacings of a plurality of parallel lines. Such barcodes are known as Universal Product Codes or European Article Numbers.

Machine-readable terminal identifiers 110 suitable for use with the system of the present invention may also include geometric pattern or 'two-dimensional' barcodes 402 which uses elementary dots or lines arranged into symmetric or asymmetric geometrical shapes. Such barcodes are known as matrix codes, known examples of which include Aztec Code, Datamatrix, QR Code, ShotCode, SmartCode, MaxiCode and EZCode.

In a preferred embodiment, the machine-readable terminal identifier 110 is a QR Code conforming to the ISO/IEC 18004 standard, which the imaging means 206 of the customer mobile terminal 101A is apt to read and which instructions in the memory means 202 of the customer mobile terminal 101A processed by the CPU 201 are apt to decode into alphanumerical data, typically a Uniform Resource Locator embodying an host address on the network 104, according to known techniques. Accordingly, with this embodiment, as with any other 'label'—based embodiment, there is strictly no requirement for an additional power source for the machine-readable tag 110, nor for any bridging hardware interface between the legacy PoS terminal 102 and the machine-readable tag 110, nor for any bridging software for communicating data between the legacy PoS terminal 102 and the machine-readable tag 110 one way or the other.

In an alternative embodiment, a radio-frequency identifier (RFID) tag may be affixed to the point of sale terminal 102 rather than a barcode label. This embodiment of a machine-readable terminal identifier 110 is more costly than a barcode label 401, 402 and obviates the power advantage of the label embodiments described above, albeit marginally so since this embodiment still has no requirement for any bridging hardware interface between the legacy PoS terminal 102 and the RFID 110, nor for any bridging software for communicating data between the legacy PoS terminal 102 and the RFID 110 one way or the other. However, a machine-readable RFID identifier 110 advantageously increases the operational distance between a customer mobile terminal 101A and a point of sale terminal 102 for processing an electronic transaction as described herein, to the extent that the user of a customer mobile terminal 101A may not even need to be proximate any point of sale in the retail location when processing the electronic transaction as described herein. This allows a retail location to process more transactions in any given time period, and saves time for the mobile terminal user who may simply select products from a retail shelf and pay for them substantially at the same time over the air.

In a further alternative embodiment, a unique terminal identifier of the point of sale terminal 102 on the wireless local area network 108, 109 may be used rather than or in addition to a barcode label, providing substantially the same advantages as an RFID tag. This is particularly advantageous when the hardware configuration of the point of sale terminal 102 includes a WLAN NIC 311 as described in relation to FIG. 3, since implementing the unique terminal identifier of the point of sale terminal 102 with this terminal configuration requires no additional hardware whatsoever.

Figure 5:
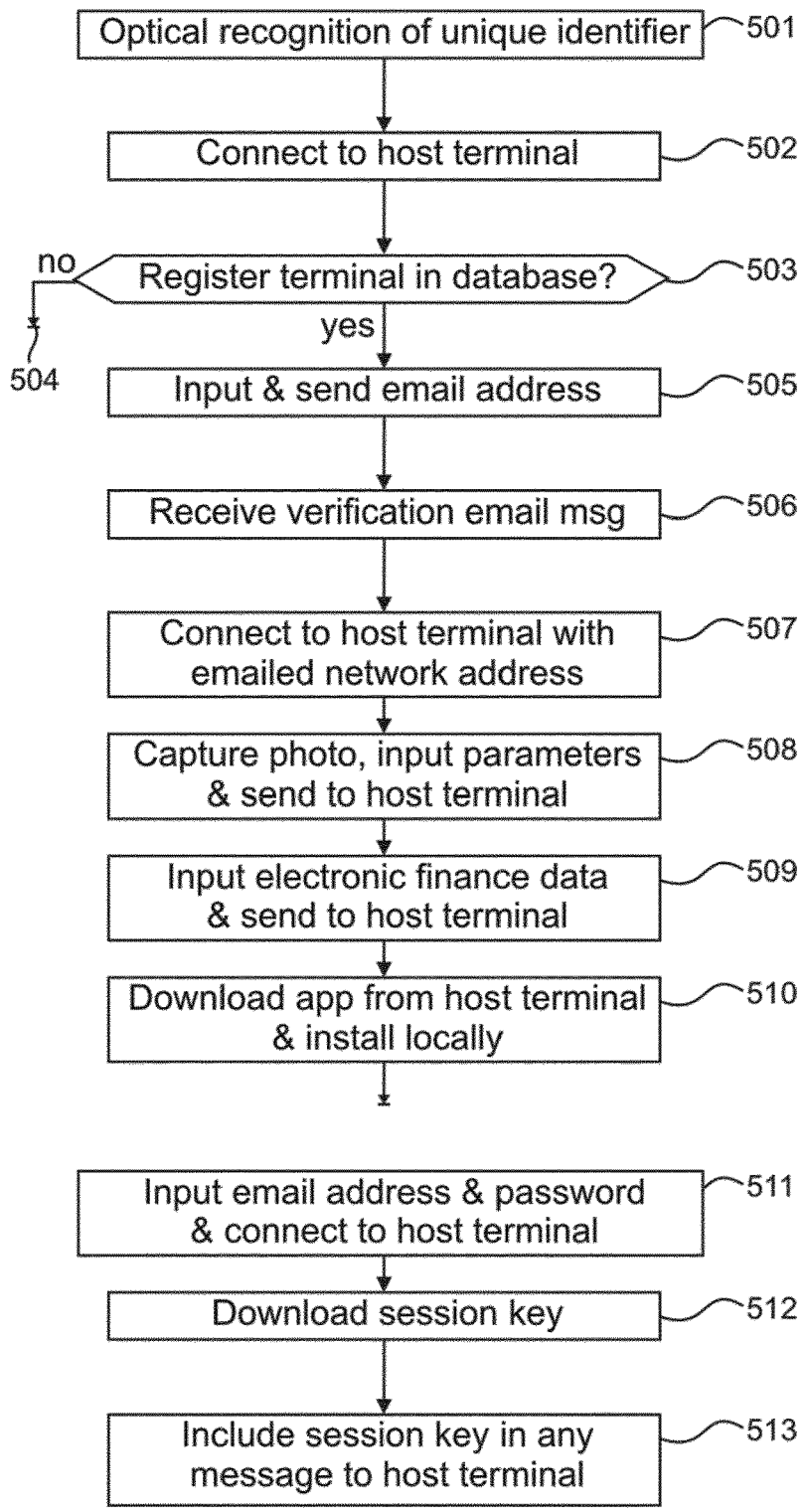
FIG. 5 details the processing steps according to which the customer mobile terminal shown in FIGS. 1 and 2 is configured for communicating data with the host terminal over the network.

With reference to FIG. 5, the processing steps according to which the customer mobile terminal 101A is configured for communicating data with the host terminal 103 over the network 101A begins with the customer mobile terminal 101A obtaining the network address of the host terminal 103.

At step 501, the imaging means 206 of the customer mobile terminal 101A reads the QR Code 110 affixed to the point of sale terminal 102 at the retail location, or affixed, printed or otherwise displayed on another support. Instructions of the customer mobile terminal 101A decode the unique identifier 110 into a unique a sequence of alphanumerical characters, a portion of which embodies a Uniform Resource Locator of the host terminal on the network 104 according to known techniques, whereby the customer mobile terminal 101A sends a request to the host terminal 103 across the network 104 at step 502 by means of this decoded address.

If the customer mobile terminal 101A has not previously been registered for use with the host terminal 103, then the host terminal 103 determines that the customer mobile terminal 101A is unknown to it and a registration procedure must first be followed, whereby the user of the customer mobile terminal 101A is queried at step 503, as to whether to register. If the user declines, then the host terminal 104 concludes the data communication at step 504 and the user of the customer mobile terminal 101A may conduct a conventional transaction at the point of sale terminal 102, electronic or otherwise.

Figure 6:
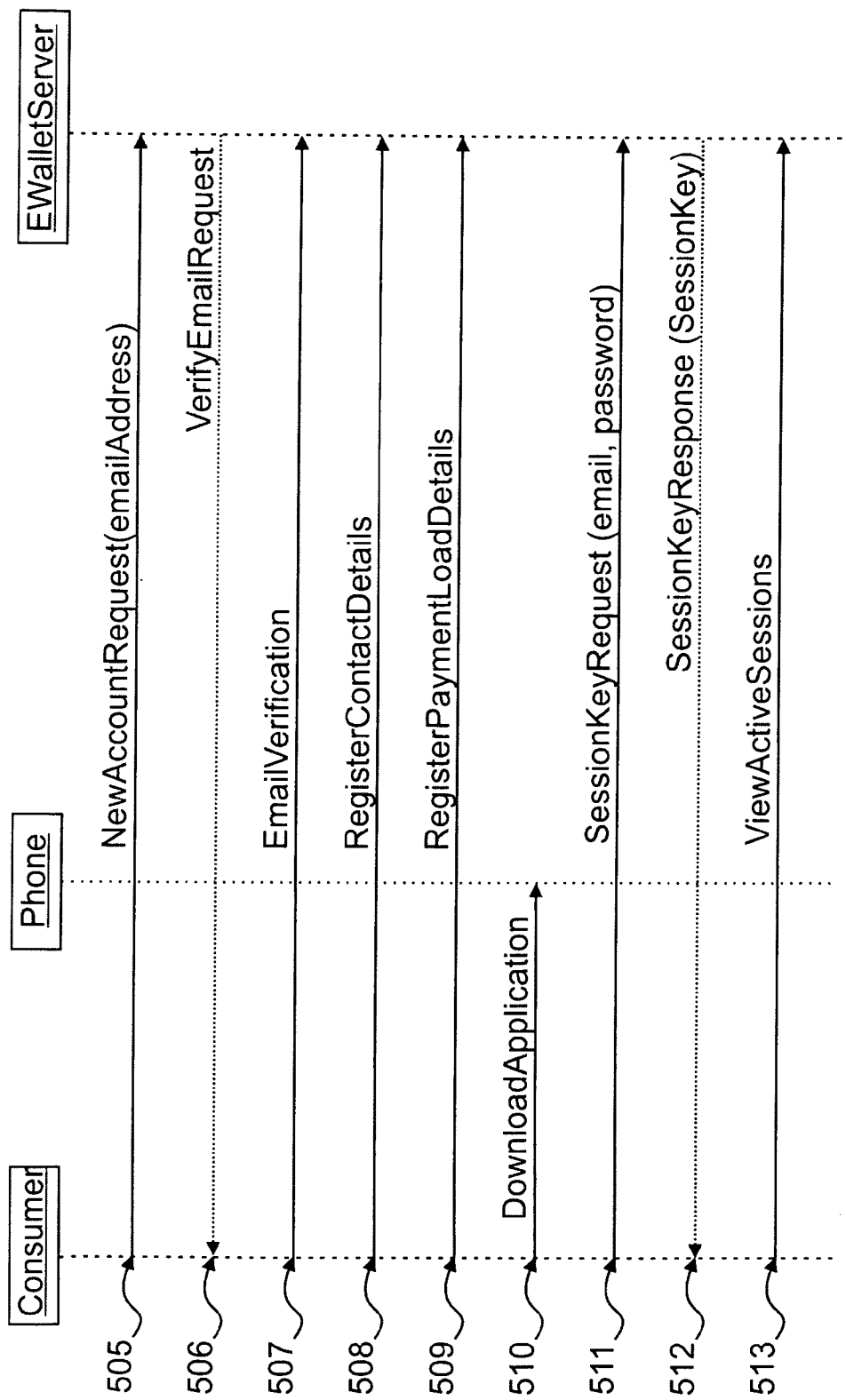
FIG. 6 is a chronological representation of data communications between the customer mobile terminal and the host terminal according to the processing steps of FIG. 5.

With reference to FIGS. 5 and 6 now, if the user opts to follow the registration procedure, then at step 505 the customer mobile terminal 101A sends at least one parameter representative of the user, in the example an electronic mail address, to the host terminal 103. At step 506, the host terminal 103 sends a message to the communicated electronic mail address across the network 104, wherein the message comprises a verification token, for instance a Uniform Resource Locator embodying the host address on the network 104 and a unique identifier for the registration session.

At step 507, the customer mobile terminal 101A verifies the electronic mail address by accessing the host terminal 103 with the Uniform Resource Locator and unique identifier for the registration session. At step 508, the customer mobile terminal 101A may communicate further parameters representative of the user, for instance a photograph of the user, a name of the user, residence data of the user. At step 509, the customer mobile terminal 101A communicates financial data of the user, for instance a payment card number, an online payment system user identifier, a financial institution account number or the like. All of the data communicated by the customer mobile terminal 101A to the host terminal 103 over the network 104 at steps 505, 508 and 509 is stored by the host terminal 103 in a relevant data structure, for instance a database, and uniquely associated with a unique host terminal access token, for instance a user password.

At step 510, the customer mobile terminal 101A requests and obtains a set of data processing instructions from the host terminal 103 over the network 104 which, when processed, configure the customer mobile terminal 101A for processing distributed electronic transactions with point of sale terminals 102 via the host terminal 103 and configure the display 209 of the customer mobile terminal 101A with a corresponding user interface.

Whenever a distributed electronic transaction is initiated in the present system, the set of data processing instructions configures the customer mobile terminal 101A to establish a secure connection with the host terminal 103 at step 511, by communication a request for an authentication token, in the example a session key, the request comprising the stored electronic mail address of step 505 and the password. The host terminal 103 authenticates the request by comparing the communicated electronic mail address and password with the database contents and returns a valid session key to the customer mobile terminal 101A at step 512. The session key is communicated with each subsequent network message sent at step 513 by the customer mobile terminal 101A, for maintaining a verification that payment authorisation messages are broadcast by an authorized terminal 101A.

Figure 7:
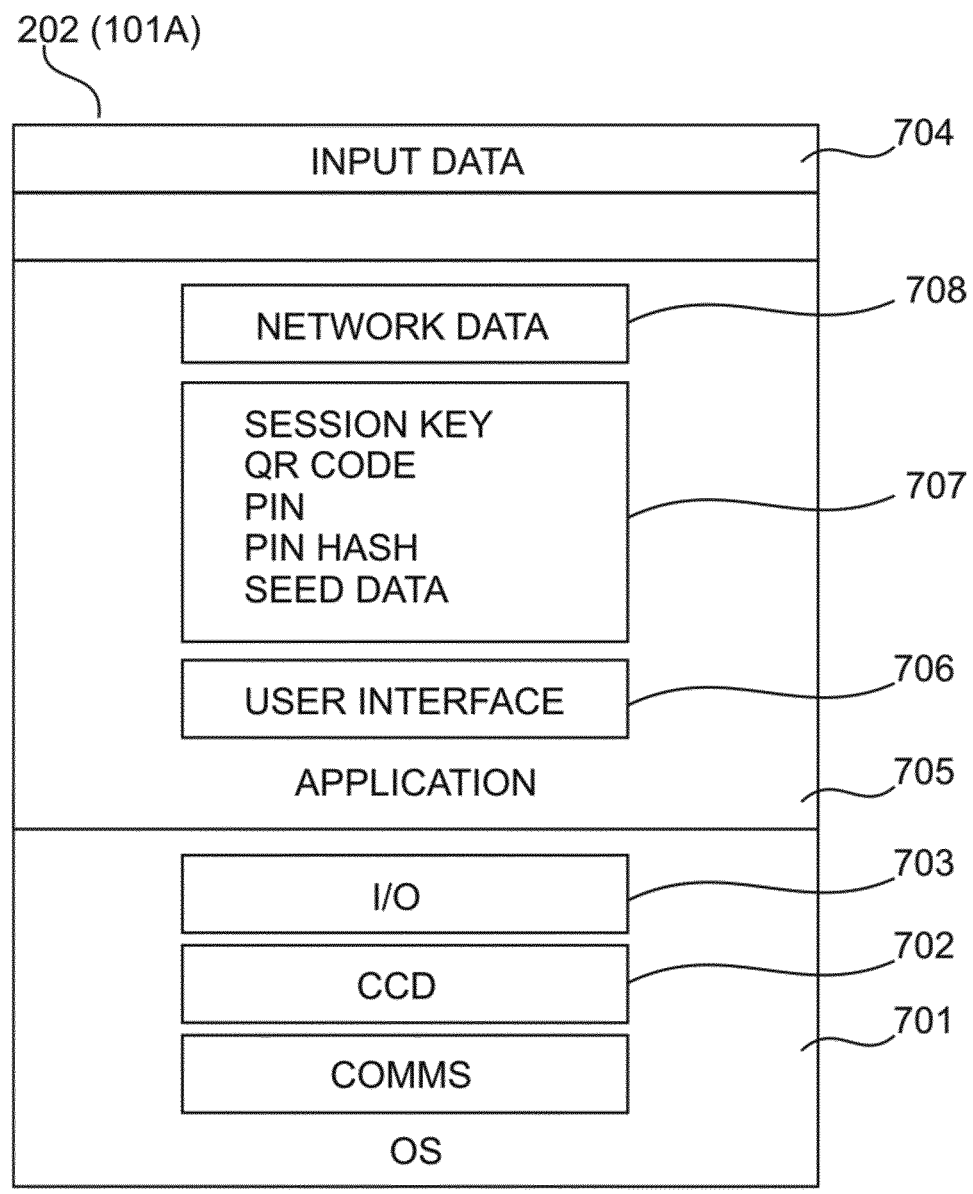
FIG. 7 shows the contents of memory means of the customer mobile terminal of FIGS. 1 and 2 after the processing steps of FIGS. 5 and 6.

FIG. 7 shows the contents of memory means 202 of the customer mobile terminal 101A at runtime, after the processing steps of FIGS. 5 and 6. An operating system is shown at 701 which, if the customer mobile terminal 101A is a mobile telephone handset, may be iOS4™ distributed by Apple Corporation or Android™ distributed by Goole, Inc. A subset 702 of the operating system 701 corresponds to instructions for processing the input from the electronic image sensor 206 into digital image data. Another subset 703 of the operating system 701 corresponds to instructions for processing tactile interrupts on the display 209 into digital input data 704.

The application downloaded and installed at step 511 is shown at 705, which is interfaced with the OS 701, and the imaging and input translating subsets 702, 703 thereof via one or more suitable application programmer interfaces. A user interface of the application 705 is shown at 706, with which the user of the customer mobile terminal 101A interacts by providing tactile interrupts on the display 209.

User of customer mobile terminals 101A authorize electronic transactions by inputting their personal identification number in the user interface 706, and the application 705 creates a mathematical version of the PIN, known as a PIN hash, by processing the alphanumerical sequence of the PIBN with an algorithm using seed data. The application 705 subsequently communicates the PIN Hash to the host terminal 103.

Application data comprises local data 707 such as the session key of step 512, the user PIN or a PIN hash processed from same, and network data 708 being sent to, or received from, the host terminal 103. Application data received from the host terminal 103 includes the session key at step 512, and thereafter may include, non-exhaustively, data representative of the particulars of a transaction, data representative of a payment request message and data representative of a message indicating completion of a transaction. Application data sent to the host terminal 103 includes the electronic mail address and password of step 511 before the session key is received at step 512, and thereafter may include, non-exhaustively, decoded data representative of the unique machine-readable terminal identifier 110 of a point of sale terminal 102 configured for communicating data with the host terminal 103 over the network 104 and the PIN hash for confirming that the electronic transaction should be settled.

Figure 8:
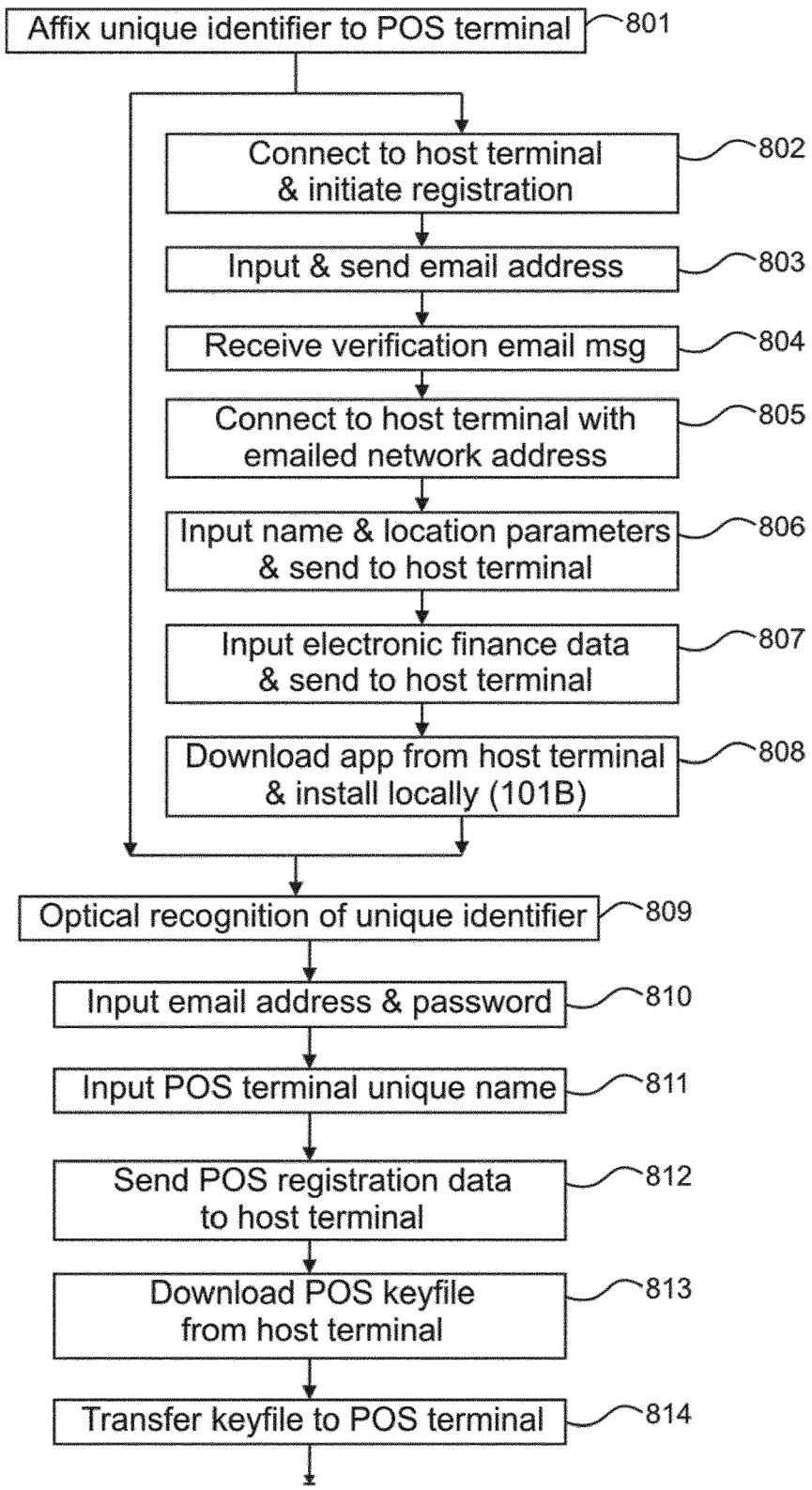
FIG. 8 details the processing steps according to which the point of sale terminal shown in FIGS. 1 and 3 is configured for communicating data with the host terminal over the network, including a step of affixing a unique machine-readable identifier.
Figure 9:
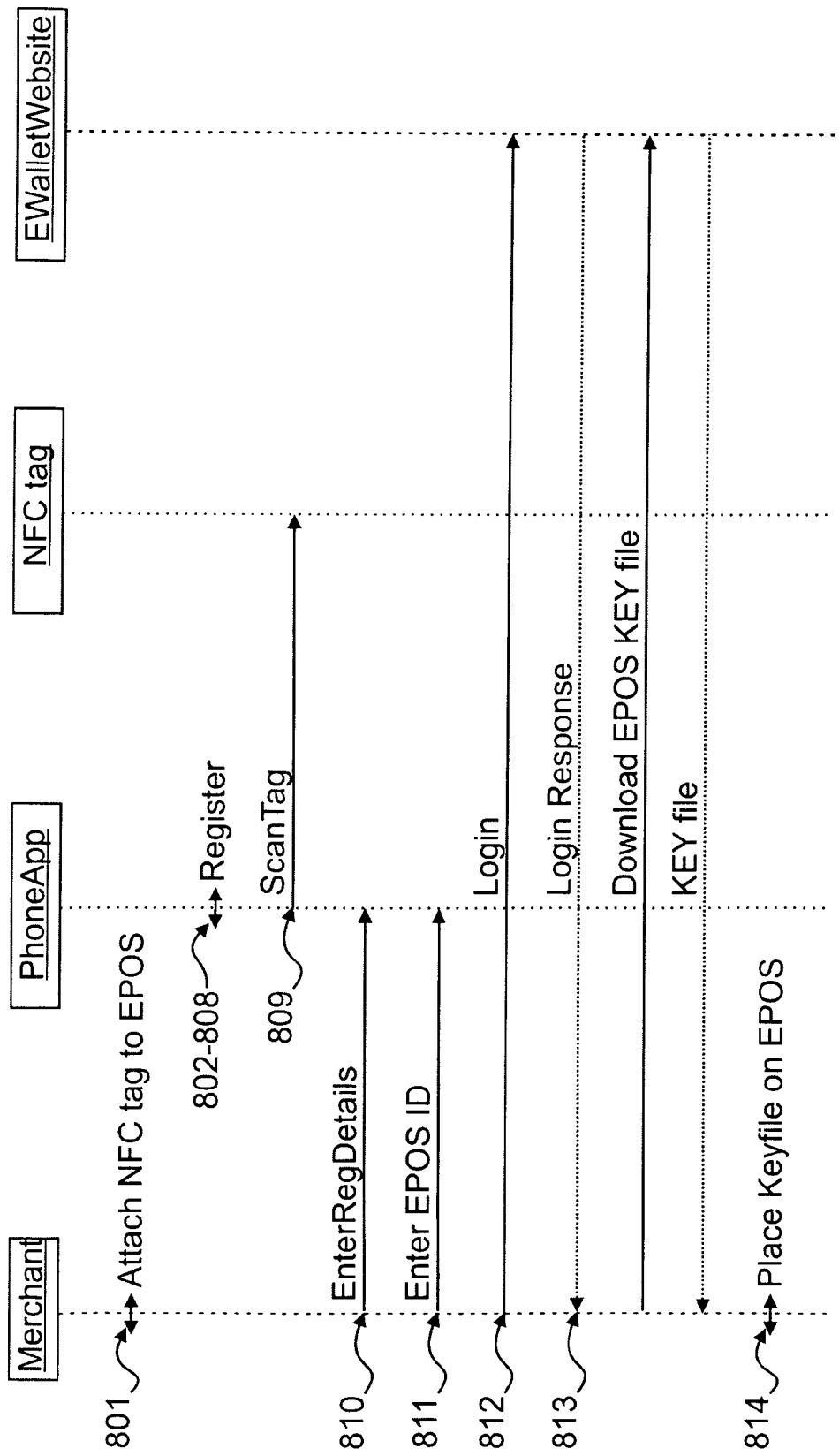
FIG. 9 is a chronological representation of data communications between the point of sale terminal and the host terminal according to the processing steps of FIG. 8.

With reference to FIGS. 8 and 9, the processing steps according to which the point of sale terminal 102 is configured for communicating data with the host terminal 103 over the network 104 begins with the user of the point of sale terminal 102, a merchant, receiving a unique machine-readable terminal identifier 110, 402 and affixing it to the terminal at step 801. The user of the point of sale terminal 102 next requires the use of a merchant mobile terminal 101B substantially as described hereinbefore with reference to FIGS. 1 and 2.

If the merchant has not previously registered any point of sale terminal 102 for use with the host terminal 103, then the host terminal 103 initiates a registration procedure with the merchant mobile terminal 101B at step 802. At step 803, the merchant mobile terminal 101B sends at least one parameter representative of the store at which one or more point of sale terminals 102 are located, in the example an electronic mail address, to the host terminal 103. At step 804, the host terminal 103 sends a message to the communicated electronic mail address across the network 104, wherein the message comprises a verification token, for instance a Uniform Resource Locator embodying the host address on the network 104 and a unique identifier for the registration session.

At step 805, the merchant mobile terminal 101B verifies the electronic mail address by accessing the host terminal 103 with the Uniform Resource Locator and unique identifier for the registration session. At step 806, the merchant mobile terminal 101B may communicate further parameters representative of the store, for instance a name and address of the store. At step 807, the merchant mobile terminal 101B communicates financial data of the store, for instance a payment card number, an online payment system user identifier, a financial institution account number or the like. All of the data communicated by the merchant mobile terminal 101B to the host terminal 103 over the network 104 at steps 803, 806 and 807 is stored by the host terminal 103 in a relevant data structure, for instance a database, and uniquely associated with a unique host terminal access token, for instance a merchant password.

At step 808, the merchant mobile terminal 101B requests and obtains a set of data processing instructions, e.g. a merchant application, from the host terminal 103 over the network 104 which, when processed, configures the merchant mobile terminal 101B to access and conduct a variety of operations with the financial data stored in the database. The database and the set of data processing instructions of step 808 are required to settle financial transactions between the host terminal 103 and the store's financial services provider, details of which were input at step 807. As distributed electronic payment transactions are processed throughout the day with consumer mobile terminals 101A, the store account balance increases in the database. The user of the merchant mobile terminal 101B may select to transfer any portion of their store balance to their registered financial account or to another account maintained in the database with the merchant application of step 808, which preferably configures the display 209 of the merchant mobile terminal 101B with a corresponding user interface.

After performing steps 802 to 808 or, alternatively, if the merchant has previously registered a first point of sale terminal 102 for use with the host terminal 103 in which case steps 802 to 808 are bypassed, then at step 809, the imaging means 206 of the merchant mobile terminal 101A reads the QR Code 110 newly-affixed to the point of sale terminal 102. Instructions of the merchant mobile terminal 101B decode the QR Code 110 into unique a sequence of alphanumerical characters, a portion of which embodies the Uniform Resource Locator of the host terminal on the network 104 according to known techniques.

The merchant inputs the electronic mail address and merchant password associated with the merchant mobile terminal 101B at step 810, and inputs a unique sequence of alphanumerical characters of their choice as the respective name of the point of sale terminal 102 to which the QR Code 110 has been newly-affixed at step 811. At step 812, the merchant mobile terminal 101B logs in at the host terminal 103 across the network 104 and communicates this input.

The host terminal authenticates the merchant mobile terminal 101B with the received electronic mail address and merchant password, and updates the store records stored in the database with the communicated input, which registers the point of sale terminal 102 at the host terminal 103. The host terminal 103 next generates a unique point of sale terminal keyfile from at least the unique sequence of alphanumerical characters communicated as the respective name of the point of sale terminal 102. The keyfile is a small set of data and instructions for configuring the point of sale terminal 102 to perform steps required to process a distributed electronic transaction when in use. At step 813, the merchant mobile terminal 101B requests and obtains the unique point of sale terminal keyfile from the host terminal 103 over the network 104 and transfers the keyfile to the memory means 309 of the point of sale terminal 102 according to known techniques at step 814, at which time the point of sale terminal 102 is fully configured for use with the host terminal 103.

Figure 10:
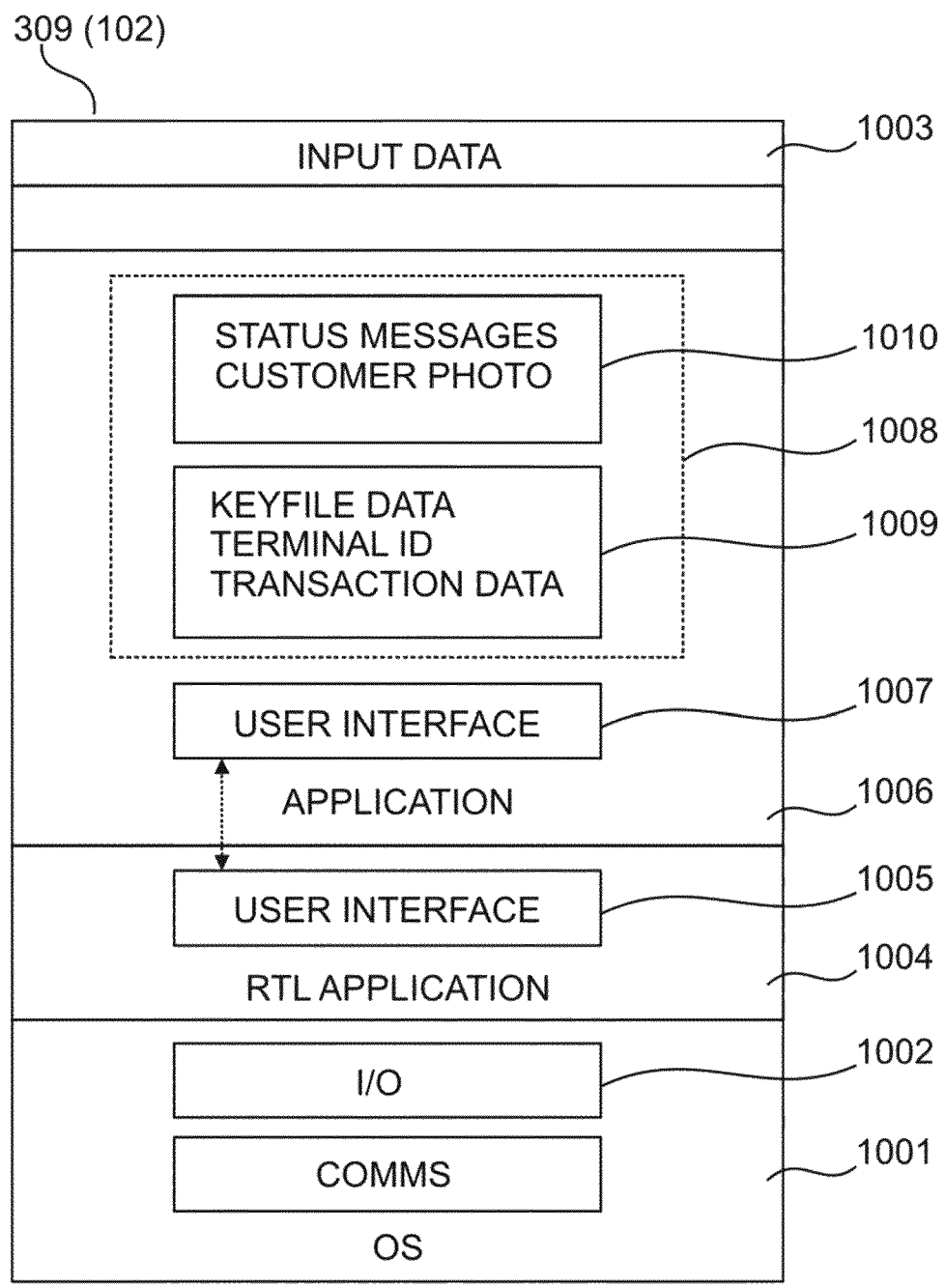
FIG. 10 shows the contents of memory means of the point of sale terminal of FIGS. 1 and 3 after the processing steps of FIGS. 8 and 9.

FIG. 10 shows the contents of memory means 309 of the point of sale terminal 102 at runtime, after the processing steps of FIGS. 7 and 8. An operating system is shown at 1001 which, if the point of sale terminal 102 is a desktop computer, may be Windows 7™ distributed by Microsoft Corporation. A subset 1002 of the operating system 1001 corresponds to instructions for processing any of interrupts on the display 302, the keyboard 303 and the HiD devices 303, 304 into digital input data 1003. A retail application is shown at 1004, which configures the point of sale terminal 102 to collate data representative of the particulars of a transaction, for instance by matching product barcodes scanned with an optical reader by the merchant with electronic inventory records comprising product details and product price data, and having a user interface 1005 which is displayed on VDU 302 via the video adapter 314.

The instruction set of the keyfile downloaded and installed at steps 813, 814 is shown at 1006, which is interfaced with the OS 1001, the input translating subset 1002 and the retail application 1004 via one or more suitable application programmer interfaces. A user interface of the application 1006 is shown at 1007 which, in its simplest embodiment, may take the form of a user-selectable 'pay by mobile' button implemented within the user interface 1005 of the retail application 1004, wherein the user of the point of sale terminal 102 calls upon the functionality of the application 1006 by providing a tactile interrupt on the button 1007 displayed in the interface 1005 or selecting it with the mouse 304.

Application data is shown at 1008, which comprises local data 1009 such as the dataset of the keyfile of steps 813, 814 and transaction products, quantities and prices data, and network data 1010 being sent to, or received from, the host terminal 103. Application data 1010 received from the host terminal 103 includes data representative of a message indicating completion of a transaction, optionally including image data representative of the user of a customer mobile terminal 101A with whom a transaction has been processed. Application data 1010 sent to the host terminal 103 includes, non-exhaustively, data representative of the particulars of a transaction and data representative of the unique machine-readable terminal identifier 110 of the point of sale terminal 102.

Figure 11:
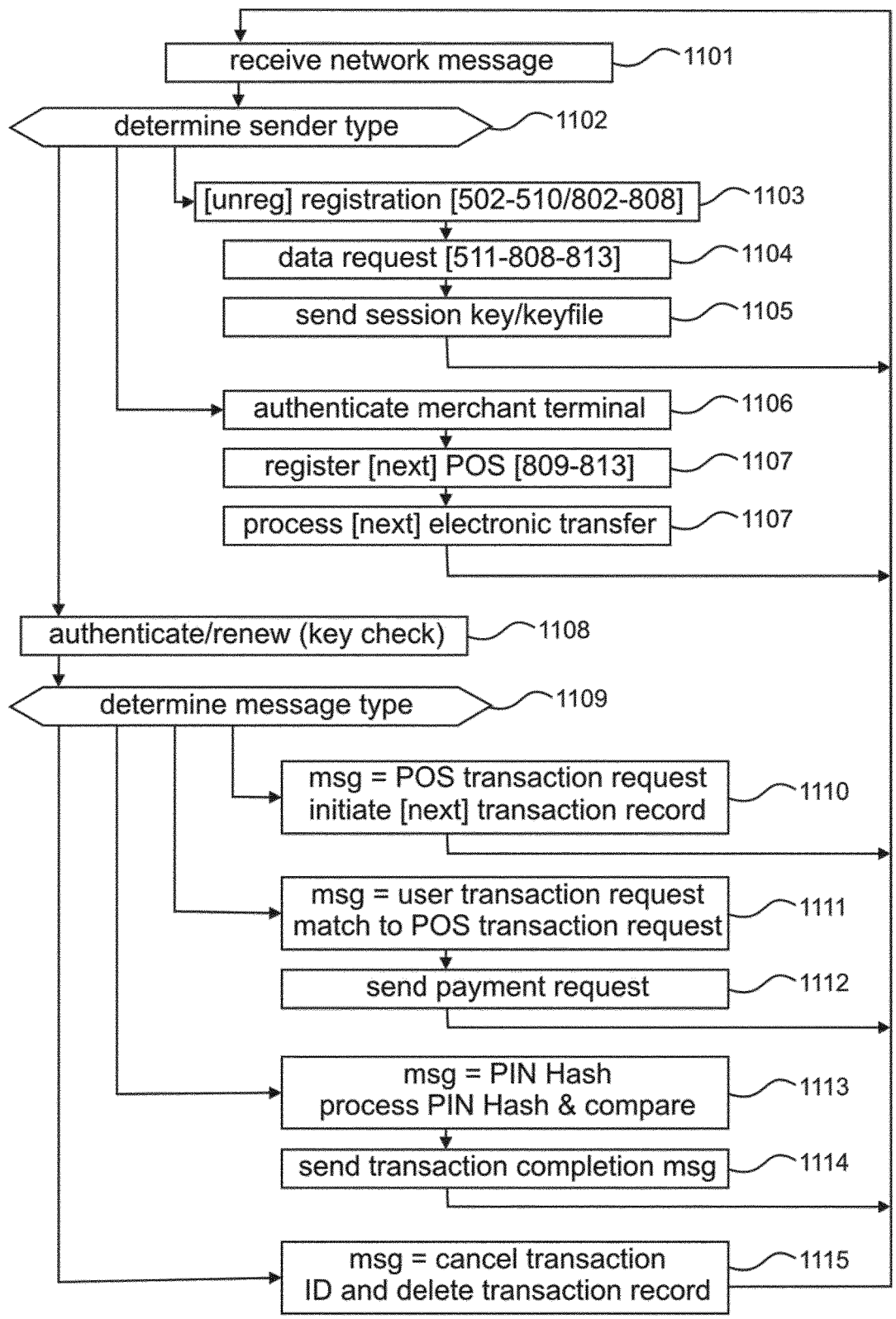
FIG. 11 details the processing steps according to which the host terminal shown in FIGS. 1 and 3 processes and communicates data with the customer mobile terminal and the point of sale terminal over the network.

The processing steps according to which the host terminal 103 processes data and communicates data with the customer mobile terminal 101A and the point of sale terminal 102 over the network 104 are detailed with reference to FIG. 11. At step 1101, the host terminal 103 receives network data from a mobile terminal 101A, 101B or from a point of sale terminal 102. A determination is made at step 1102, as to whether the network data has been sent by a registered customer mobile terminal 101A, a registered merchant mobile terminal 101B, a registered point of sale terminal 102 or an unregistered mobile terminal 101A, 101B If the determination identifies an unregistered mobile terminal 101A, then the host terminal performs a registration procedure at step 1103, respectively according to steps 505 to 510 if the network data has been sent by an unregistered customer mobile terminal 101A, or according to steps 802 to 808 if the network data has been sent by an unregistered merchant mobile terminal 101B. At step 1104, the host terminal subsequently receives a data request for the user application 705 of step 511, the merchant application of step 808 or for the keyfile 100 of step 813, which it then communicates to the requesting registered mobile terminal 101A, 101B at step 1105. Control subsequently returns to step 1101.

Alternatively, if the determination identifies a registered merchant mobile terminal 101B, then the host terminal authenticates access at step 1106 and communicates data with the terminal 101B, either for registering a point of sale terminal 102 to which a QR Code 110 has been newly-affixed according to steps 809 to 814 at step 1107, or for processing a variety of operations with the financial data stored in the database as described with reference to FIG. 8, for instance transferring portions of store balance to registered financial accounts, at step 1107. Control subsequently returns to step 1101.

Alternatively still, if the determination identifies a registered user mobile terminal 101A or a registered point of sale terminal 102, then at step 1108 the host terminal authenticates access or, depending on the processing stage of an ongoing distributed electronic transaction, maintains or renews access via, respectively, the session key 707 of the registered user mobile terminal 101A or the keyfile 1008 of the registered point of sale terminal 102.

At step 1109, the encoded network data is decoded and a determination is made as to whether the network data is an encoded transaction request message including a unique point of sale terminal identifier 110, a PIN Hash or a transaction cancellation interrupt sent by a registered user terminal 101A, or an encoded transaction request message sent by a registered point of sale terminal 102.

If the determination identifies a transaction request message sent by a registered point of sale terminal 102, then at step 1110 the host terminal 103 instantiates and stores a new transaction record in the database, which it associates with the point of sale terminal identifier 110 of the sending registered point of sale terminal 102 and which it populates with the transaction data, typically product data, product quantity data and price data. The host terminal 103 may optionally associate further data with the transaction record, intended to further facilitate the decision by the user of the relevant registered user terminal 101A to accept or reject the transaction request. Such further data may for instance include store-specific and/or location data, e.g. store name, address and optionally corporate trade mark or logo; payable amount in store currency; and items concerned by the transaction. Control subsequently returns to step 1101.

Alternatively, if the determination identifies a transaction request message sent by a registered user terminal 101A, then at step 1111 the host terminal 103 matches the transaction request of the user terminal 101A with a stored transaction request message of a point of sale terminal 102, using the point of sale terminal identifier 110 contained in the message sent by the registered user terminal 101A for identifying the corresponding stored transaction record. At step the next 1112. the host terminal 103 encodes and communicates a payment request message to the customer mobile terminal 102, to which the customer mobile terminal 102 is expected to reply with the PIN hash or a transaction cancellation interrupt, as the case may be. Control subsequently returns to step 1101.

Alternatively, if the determination identifies a PIN hash, the seed data that is used to process the PIN into the PIN hash on the customer mobile terminal 101 is included in the communication and, at step 1113, the host terminal 103 performs the same processing of the PIN into a PIN hash and compares the result to the received PIN hash. If both PIN hashes match, then the host terminal 103 authorizes electronic payment for the stored transaction and, at step 1114, communicates a message indicative of transaction completion to the relevant point of sale terminal 102 associated with the transaction record, optionally including image data representative of the user of the customer mobile terminal 101 for purposes of final security verification. Control subsequently returns to step 1101. The host server 103 may optionally also communicate a message indicative of transaction completion to the customer mobile terminal 101. Control subsequently returns to step 1101.

Alternatively, if the determination identifies a transaction cancellation interrupt sent by a registered user terminal 101A, then at step 1115 the host terminal 103 matches the cancellation interrupt with the corresponding stored transaction record and deletes the record from the database. Control subsequently returns to step 1101.

Figure 12:
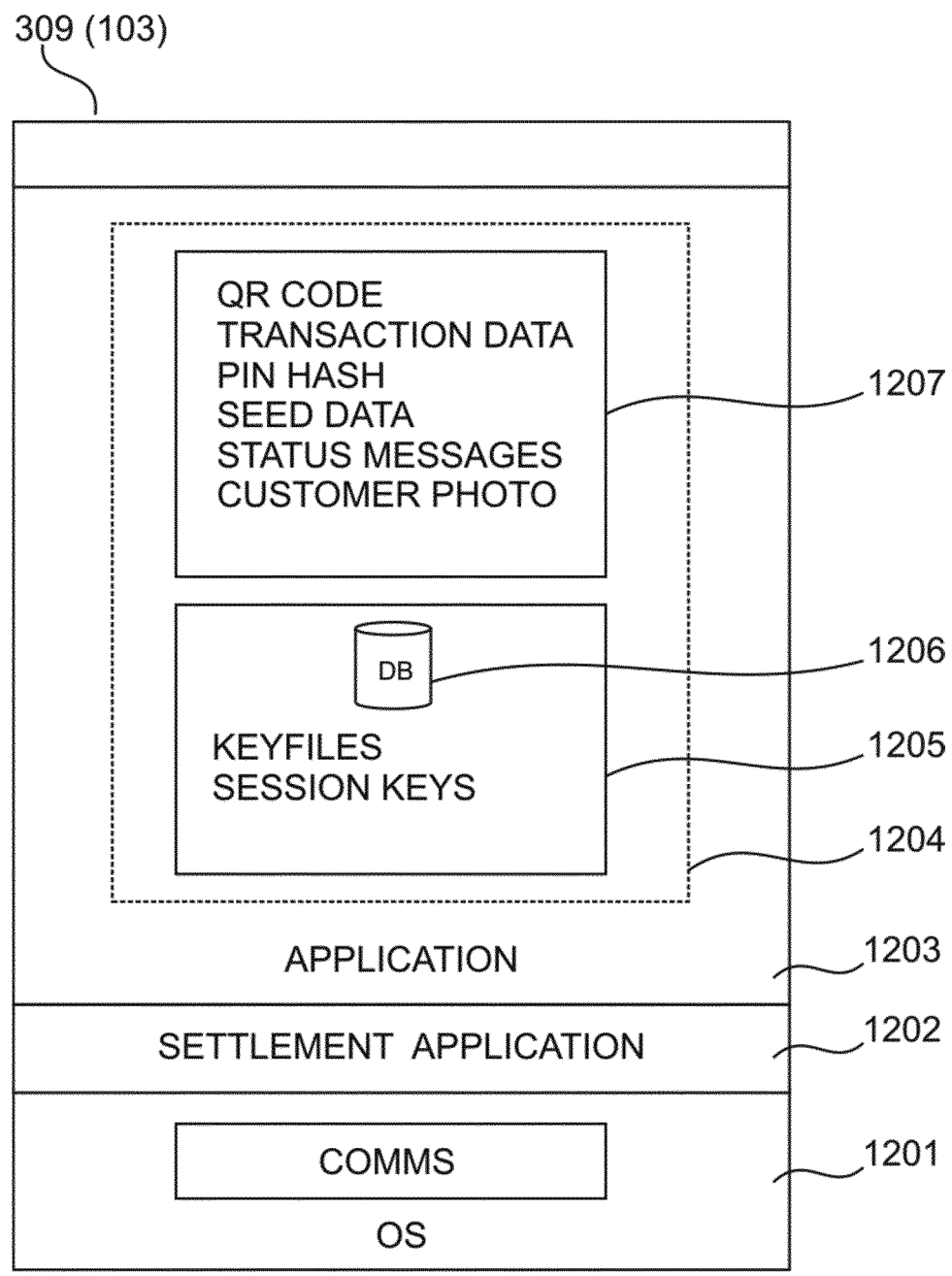
FIG. 12 shows the contents of memory means of the host terminal of FIGS. 1 and 3 in use.

FIG. 12 shows the contents of memory means 309 of the host terminal 103 in use, at runtime. An operating system is shown at 1201 which, if the host terminal 103 is a desktop computer, may be Windows 7™ distributed by Microsoft Corporation.

A payment settlement application is shown at 1202, which interfaces the host terminal 103 with conventional electronic payment systems, for instance card payment scheme networks including card payment authorisation hosts and card payment settlement hosts, online payment providers such as Paypal™ and more. An application is shown at 1203, which configures the host terminal 103 to perform at least processing steps 1101 to 1115 as described hereinbefore, and which is interfaced with the OS 1201 and the payment settlement application 1202 via one or more suitable application programmer interfaces.

Application data is shown at 1204, which comprises local and network data. Local data 1205 comprises the database 1206 of registered customer mobile terminals 101A, registered stores and registered point of sale terminals 102, wherein each registered customer mobile terminal 101A is uniquely identified therein by its respective unique combination of personal electronic mail address and password, as well as image data representative of its user where available, and each registered point of sale terminal 102 is uniquely identified therein by its respective unique machine-readable terminal identifier 110. Local data further comprises session keys 707 and keyfiles 1008.

Network data 1207 comprises data received at the host terminal 103 respectively from customer mobile terminals 101A (1208) and point of sale terminals 102 (1209), and data sent by the host terminal 103 respectively to customer mobile terminals 101A (1210) and point of sale terminals 102 (1211). Network data 1207 thus comprises data representative of the particulars of transactions, decoded data representative of unique machine-readable terminal identifiers 110, data representative of payment request messages, encoded personal identification numbers and data representative of messages indicating completion of transactions.

Figure 13:
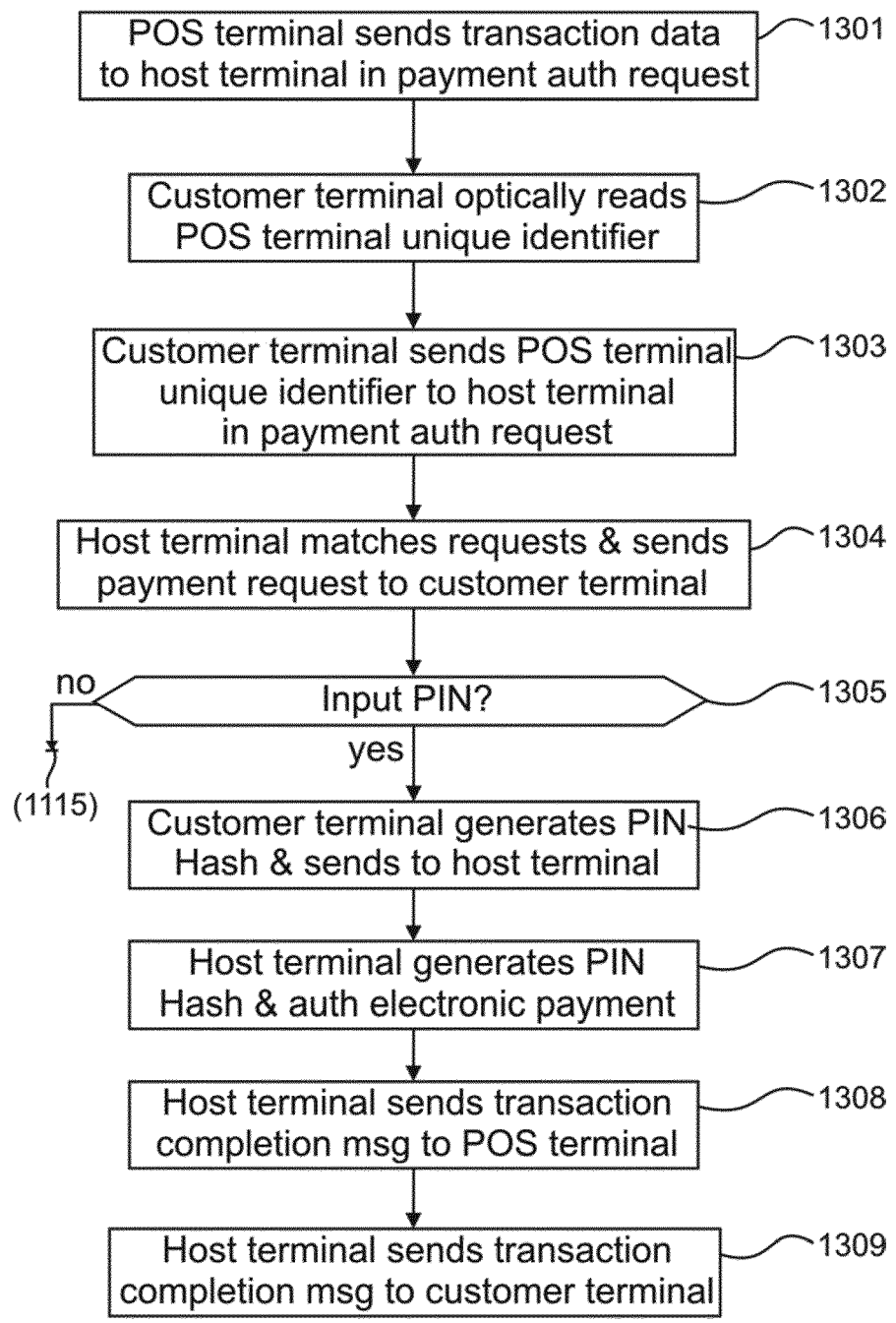
FIG. 13 details the steps of a distributed electronic transaction between the customer mobile terminal, the point of sale terminal and the host terminal over the network in the system shown in FIGS. 1 to 12.
Figure 14:
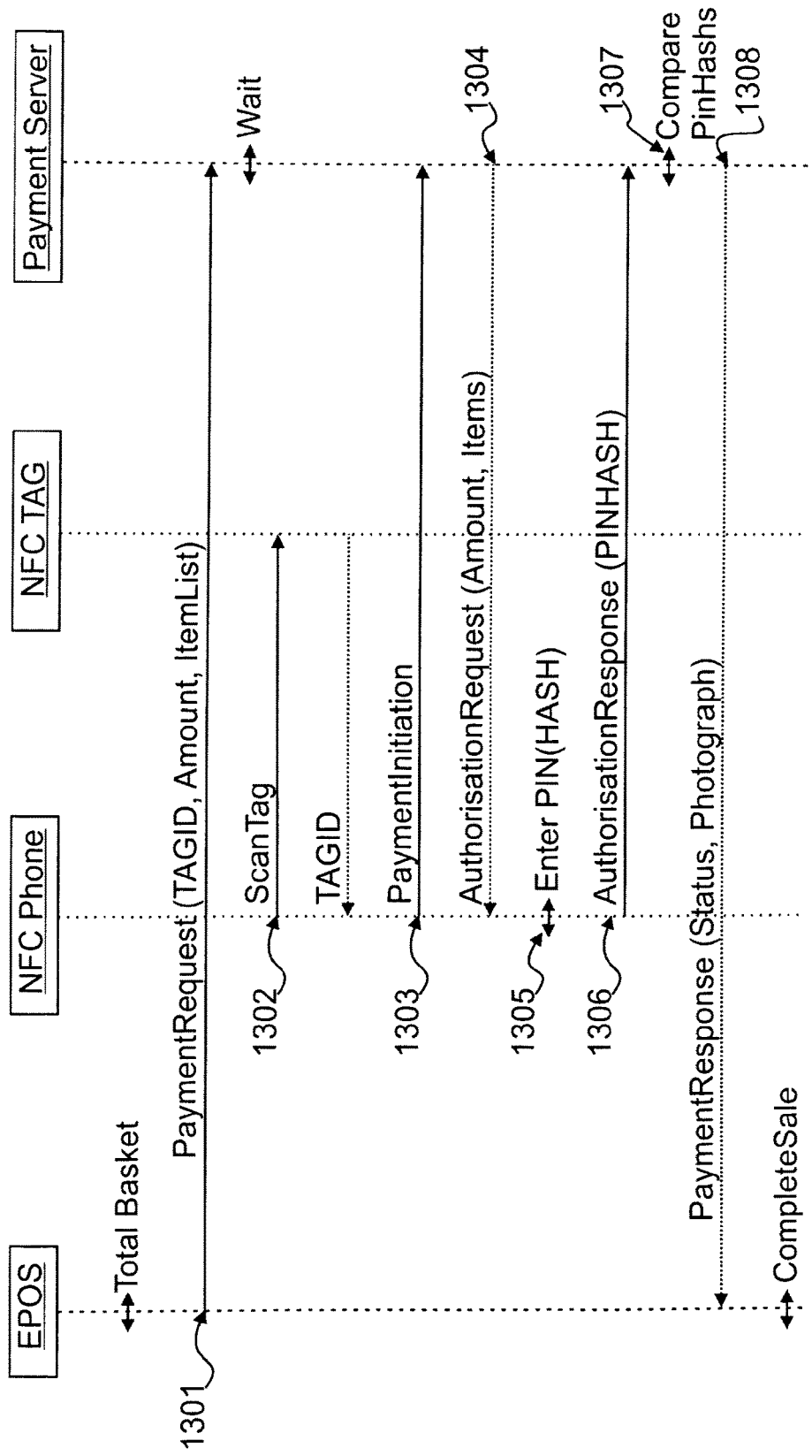
FIG. 14 is a chronological representation of data communications between the customer mobile terminal, the point of sale terminal and the host terminal according to the steps of FIG. 13.

With reference to FIGS. 13 and 14, the steps of a distributed electronic transaction between the customer mobile terminal 101A, the point of sale terminal 102 and the host terminal 103 over the network 104.

A consumer presents their basket of items to the merchant at the point of sale. The merchant scans details of the items and their respective quantities into the point of sale terminal 102 and a transaction total amount is calculated, according to known techniques. The details and quantity of each item in the basket and the transaction total amount are sent by the point of sale terminal 102 to the host terminal 103 in a payment authorization request at step 1301. In parallel, the consumer scans the tag 110 that is attached to the point of sale 102 with their customer mobile terminal 101A at step 1302. The unique POS identifier data encoded in the tag 110 is sent from the customer mobile terminal 101A to the host terminal 103 at step 1303.

The host terminal 103 receives the respective messages from steps 1301 and 1303, and generates a payment authorization request message, which it sends to the customer mobile terminal 101A at step 1304. The payment authorization request message includes the items and the total amount for the payment request The application 705 on the customer mobile terminal 101A displays the payment request and prompts the consumer to input their PIN at step 1305, to be processed into a PIN hash. The consumer may either reject the transaction or authorize it by inputting their PIN. The customer mobile terminal 101A generates a PIN hash and a payment authorization message from the PIN input, sent to the host terminal 103 in response at step 1306.

The host terminal 103 stores a mathematical version of the consumer PIN and never the actual PIN or an encrypted version thereof. At step 1307, the host terminal 103 performs the same algorithmic operations as the customer mobile terminal 101A and compares the result to the PIN hash sent from the customer mobile terminal 101. The electronic payment is authorized if the comparison yields a match.

If the electronic payment is authorized, then at step 1308 the host terminal 103 responds to the point of sale terminal 102 with a payment authorization response, which may also include a photograph of the consumer. At step 1309, the point of sale terminal 102 receives the authorization response and displays the optional photograph to the merchant. The merchant may use the photograph as a final authorization check. Throughout the above, all communications are encrypted using a Secure Socket Layer.

It will be readily understood by the skilled reader that the above principles, which are all embodied through network communications, are not intended to be limited to physical environments often referred to as 'bricks and mortar', but are eminently adaptable to network-only marketplaces, such as online stores. Indeed, the two dimensional QR code 110 may be generated as an image file and stored by an online store server configured as a POS 102, to be communicated to every remote purchaser as part of an online checkout page. Such remote users may thus avail of substantially the same payment method as described hereinabove with their respective mobile terminal 101A, by performing step 1302 on the display 302 of their personal computing device. Alternatively the QR code 110 can be dynamically created where the code can be auto-generated online using an algorithm, and then matched at the back end host. By generating the QR code in this way eliminates the risk of fraud.

It will also be readily understood by the skilled reader that the distributed nature of the system, and the core functionality provided by the configuration of host terminal 103, allow for ease of scalability and ease of implementation of additional features, still without requiring any further changes to the software or hardware of a POS 101B, save as to the limited set of instructions 1006.

A first example of an additional feature that may be implemented in the application 1203 is dynamic currency conversion, when the currency of the customer account registered pursuant to step 509 differs from the currency of the transaction request of step 1304. In this case, the application 1203 may usefully perform currency conversion substantially in real-time between steps 1303 and 1304, so that the transaction request contains transaction amount data in both currencies and an exchange rate. This helps the user of the mobile terminal 101A better understand how much the goods considered for purchase are worth.

A second example of an additional feature that may be implemented in the application 1203 is dynamic rebating, when the store with the POS 102 concerned by a transaction request is providing point-in-time, frequency-based or spend-based incentives. In this case, the application 1203 may usefully perform dynamic rebating substantially in real-time between steps 1303 and 1304 according to relevant data stored in the database 1206 against the POS 102 identifier and/or the mobile terminal identifier, so that the transaction request contains a transaction amount data reflecting the incentive. Again this helps the user of the mobile terminal 101A better understand how much the goods considered for purchase are worth.

Further examples consider the additional configuration of the host by application 1203 to allow users of registered mobile terminals 101A to update some or all of their respective data in database 1206. Such user-input may include crediting a personal account maintained locally in database 1206 with funds from any or a combination of traditional bank accounts, online-only bank or deposit accounts, payment cards and the like. More simply, or additionally, such user-input may include viewing balance and/or transaction history. Usefully, such user-input may include the registration of new and/or additional terminals substantially according to steps 505 to 510, so that users may register a plurality of personal devices for e.g. different, respective fund sources, or different family members, and administer these with e.g. transaction limits in given periods.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method of processing a transaction in a distributed electronic payment system comprising at least one point of sale terminal and at least one customer mobile terminal, each being respectively configured to communicate with at least one host terminal over a network, the method comprising the steps of:
   associating the at least one point of sale terminal with a machine readable unique identifier, wherein the identifier is a near field communication (NFC) tag;
   reading the machine-readable unique identifier of the at least one point of sale terminal with the at least one customer mobile terminal;
   at each of the at least one point of sale terminal and the at least one customer mobile terminal, encoding and communicating a respective transaction request message to the at least one host terminal, wherein the encoded transaction request message communicated by the at least one point of sale terminal includes transaction data and the unique identifier and the encoded transaction request message communicated by the at least one customer mobile terminal includes the unique identifier;

at the at least one host terminal, identifying the transaction request message communicated by the at least one point of sale terminal, and instantiating and storing a transaction record associated with the unique identifier and populated with the transaction data included in the transaction request message of the at least one point of sale terminal;

at the at least one host terminal, identifying the transaction request message communicated by the at least one customer mobile terminal, and matching the transaction request message of the at least one customer mobile terminal with the stored transaction request message of the at least one point of sale terminal using the unique identifier contained in the transaction request message of the at least one customer mobile terminal in order to identify the corresponding stored transaction record;

encoding and communicating a payment request message for the transaction record to the at least one customer mobile terminal; and inputting a personal identification number at the at least one customer mobile in response to the payment request message.

2. The method according to claim 1, comprising the further step of inputting a personal identification number at the at least one customer mobile in response to the payment request message, and comprising the further steps of encoding and communicating the personal identification number to at the at least one host terminal.

3. The method according to claim 2, comprising the further step of communicating a message indicative of transaction completion to the at least one point of sale terminal with the at least one host terminal.

4. The method according to claim 3, comprising the further step of communicating a message indicative of transaction completion to the at least one customer mobile terminal with the at least one host terminal.

5. The method according to claim 4, comprising the further step of storing image data representative of the user of the at least one customer mobile terminal at the at least one host terminal.

6. The method according to claim 5, comprising the further step of storing image data representative of the user of the at least one customer mobile terminal at the at least one host terminal and comprising the further step of including image data representative of the user in the message indicative of transaction completion.

7. The method according to claim 6, wherein the identifier is a near field communication (NFC) tag selected from the group comprising an optical machine readable tag such as a one-dimensional barcode or a two-dimensional barcode, a radio-frequency identifier (RFID) tag and a wireless network terminal identifier.

8. A distributed electronic transaction system comprising a plurality of terminals connected to a network, said terminals including:

at least one host terminal, at least one point of sale terminal configured with a machine-readable unique identifier, wherein the identifier is a near field communication (NFC) tag and affixed to the point of sale terminal, and at least one customer mobile terminal having means to read the machine-readable unique identifier, wherein the at least one point of sale terminal comprises:

means for encoding a transaction request message including the unique identifier and transaction data, and means for communicating the encoded transaction request message to the at least one host terminal over the network, and wherein the at least one customer mobile terminal comprises means for encoding a transaction request message including the unique identifier and means for communicating the encoded transaction request message to the at least one host terminal over the network, and wherein the at least one host terminal comprises:

means for identifying a transaction request message communicated by the at least one point of sale terminal, means for instantiating and storing a transaction record associated with the unique identifier for population with the transaction data included in the transaction request message of the at least one point of sale terminal, means for identifying a transaction request message communicated by the at least one customer mobile terminal, means for matching a transaction request message of the at least one customer mobile terminal with a stored transaction request message of the at least one point of sale terminal using the unique identifier contained in the transaction request message of the at least one customer mobile terminal in order to identify the corresponding stored transaction record, means for encoding a payment request message for a transaction record, means for communicating the encoded payment request message to the at least one customer mobile terminal over the network, and wherein the at least one customer mobile further comprises means for inputting a personal identification number in response to the payment request message.

9. The system according to claim 8, wherein the tag is a one-dimensional barcode or a two-dimensional barcode, and the means to read the identifier comprises optical capturing means.

10. The system according to claim 8, wherein the tag is a radio-frequency identifier (RFID) tag, and the means to read the identifier comprises radio-frequency receiving means.

11. The system according to claim 8, wherein the tag is a wireless network terminal identifier, and the means to read the identifier comprises wireless local networking means.

12. The system according to claim 11, wherein the means for encoding a transaction request message including the unique identifier comprises a terminal central processing unit configured by a set of data processing instructions.

13. The system according to claim 12, wherein the means for matching transaction request messages and the means for encoding a payment request message comprises a host terminal central processing unit configured by a set of data processing instructions.

14. A computer program comprising program instructions for causing one or more computers to perform a method of processing a transaction in a distributed electronic payment system comprising at least one point of sale terminal and at least one customer mobile terminal, each being respectively configured to communicate with at least one host terminal over a network, the method comprising the steps of:

associating the at least one point of sale terminal with a machine readable unique identifier, where the identifier is a near field communication (NFC) tag;

reading the machine-readable unique identifier of the at least one point of sale terminal with the at least one customer mobile terminal;

at each of the at least one point of sale terminal and the at least one customer mobile terminal, encoding and communicating a respective transaction request message to the at least one host terminal, wherein the encoded transaction request message communicated by the at least one point of sale terminal includes transaction data and the unique identifier and the encoded transaction request message communicated by the at least one customer mobile terminal includes the unique identifier;

at the at least one host terminal, identifying the transaction request message communicated by the at least one point of sale terminal, and instantiating and storing a transaction record associated with the unique identifier and populated with the transaction data included in the transaction request message of the at least one point of sale terminal;

at the at least one host terminal, identifying the transaction request message communicated by the at least one customer mobile terminal, and matching the transaction request message of the at least one customer mobile terminal with the stored transaction request message of the at least one point of sale terminal using the unique identifier contained in the transaction request message of the at least one customer mobile terminal in order to identify the corresponding stored transaction record;

encoding and communicating a payment request message for the transaction record to the at least one customer mobile terminal; and at the at least one customer mobile, receiving a personal identification number in response to the payment request message.

* * * * *